United States Patent
Dutt

(10) Patent No.: US 10,163,420 B2
(45) Date of Patent: Dec. 25, 2018

(54) SYSTEM, APPARATUS AND METHODS FOR ADAPTIVE DATA TRANSPORT AND OPTIMIZATION OF APPLICATION EXECUTION

(71) Applicant: DimensionalMechanics, Inc., Redmond, WA (US)

(72) Inventor: Rajeev Dutt, Redmond, WA (US)

(73) Assignee: DimensionalMechanics, Inc., Bellevue, WA (US)

( * ) Notice: Subject to any disclaimer, the term of this patent is extended or adjusted under 35 U.S.C. 154(b) by 306 days.

(21) Appl. No.: 14/878,854

(22) Filed: Oct. 8, 2015

(65) Prior Publication Data
US 2016/0105308 A1    Apr. 14, 2016

Related U.S. Application Data

(60) Provisional application No. 62/062,790, filed on Oct. 10, 2014.

(51) Int. Cl.
*H04L 12/24* (2006.01)
*H04L 29/08* (2006.01)
(Continued)

(52) U.S. Cl.
CPC ............... *G09G 5/006* (2013.01); *G06F 9/00* (2013.01); *G06N 3/0445* (2013.01); *G06N 3/0472* (2013.01); *H04L 41/083* (2013.01); *H04L 41/0886* (2013.01); *H04L 67/10* (2013.01); *H04L 67/32* (2013.01); *H04L 67/38* (2013.01);
(Continued)

(58) Field of Classification Search
CPC .... G06N 3/0445; G06N 7/005; G06N 3/0472; G06F 9/00; H04L 41/083; H04L 67/10; H04L 67/38; H04L 67/32; H04L 41/0886; G09G 5/006; G09G 2370/022
See application file for complete search history.

(56) References Cited

U.S. PATENT DOCUMENTS

| 5,485,600 A | 1/1996 | Joseph et al. |
| 5,625,788 A | 4/1997 | Boggs et al. |

(Continued)

FOREIGN PATENT DOCUMENTS

WO    WO2006/119099    * 11/2006    ............... G06N 5/00
WO    WO 2006/119099 A1    11/2006

OTHER PUBLICATIONS

Int'l Searching Authority of the PCT; Notification of Transmittal of International Search Report & Written Opinion; dated Feb. 3, 2016; Appl. No. PCT/US15/54867; pp. 1-14.
(Continued)

*Primary Examiner* — Shean Tokuta
*Assistant Examiner* — Juan C Turriate Gastulo
(74) *Attorney, Agent, or Firm* — Lane Powell, P.C.

(57) ABSTRACT

Elements and processes used to enable the generation and interaction with complex networks, simulations, models, or environments. In some embodiments, this is accomplished by use of a client-server architecture that implements processes to improve data transport efficiency (and hence network usage), reduce latency experienced by users, and optimize the performance of the network, simulation, model or environment with respect to multiple parameters.

10 Claims, 20 Drawing Sheets
(1 of 20 Drawing Sheet(s) Filed in Color)

(51) Int. Cl.
  *G06N 3/04* (2006.01)
  *G09G 5/00* (2006.01)
  *H04L 29/06* (2006.01)
  *G06F 9/00* (2006.01)
  *G06N 7/00* (2006.01)

(52) U.S. Cl.
  CPC ....... *G06N 7/005* (2013.01); *G09G 2370/022* (2013.01)

(56) References Cited

U.S. PATENT DOCUMENTS

| | | | |
|---|---|---|---|
| 5,884,027 | A | 3/1999 | Brush, II et al. |
| 6,049,805 | A | 4/2000 | Drucker et al. |
| 6,377,263 | B1 | 4/2002 | Falacara et al. |
| 6,421,047 | B1 | 7/2002 | de Groot |
| 6,725,208 | B1 | 4/2004 | Hartman et al. |
| 6,757,736 | B1 | 6/2004 | Hutchison et al. |
| 6,792,606 | B2 | 9/2004 | Halter et al. |
| 7,036,082 | B1 | 4/2006 | Dalrymple et al. |
| 7,775,885 | B2 | 4/2010 | Van Luchene et al. |
| 7,814,154 | B1 | 10/2010 | Kandekar et al. |
| 7,937,518 | B2 | 5/2011 | Boyd et al. |
| 7,944,448 | B2 | 5/2011 | Iwamura et al. |
| 8,066,571 | B2 | 11/2011 | Koster et al. |
| 8,127,297 | B2 | 2/2012 | Hamilton, II et al. |
| 8,257,173 | B2 | 9/2012 | Bergelt et al. |
| 8,412,662 | B2 | 4/2013 | Ramic et al. |
| 8,667,081 | B2 | 3/2014 | Edeckeer et al. |
| 8,751,203 | B2 | 6/2014 | Falash et al. |
| 8,825,187 | B1 | 9/2014 | Hamrick et al. |
| 8,878,877 | B2 | 11/2014 | Bhosale et al. |
| 8,881,254 | B2 | 11/2014 | Applewhite et al. |
| 9,224,218 | B2 | 12/2015 | Pahwa et al. |
| 9,594,907 | B2 * | 3/2017 | Duke ............... G06F 21/566 |
| 2004/0083389 | A1 * | 4/2004 | Yoshida ............ G06F 11/3495 726/22 |
| 2004/0088392 | A1 | 5/2004 | Barrett et al. |
| 2004/0199481 | A1 * | 10/2004 | Hartman ............ G05B 13/027 706/21 |
| 2005/0223102 | A1 | 10/2005 | Zhang et al. |
| 2007/0066403 | A1 | 3/2007 | Conkwright |
| 2007/0129148 | A1 | 6/2007 | Van Luchene |
| 2008/0120558 | A1 | 5/2008 | Nathan et al. |
| 2008/0220873 | A1 | 9/2008 | Lee et al. |
| 2008/0225718 | A1 | 9/2008 | Raja et al. |
| 2008/0280684 | A1 | 11/2008 | McBride et al. |
| 2012/0004041 | A1 * | 1/2012 | Pereira .................. A63F 13/35 463/42 |
| 2012/0188256 | A1 | 7/2012 | Lee et al. |
| 2012/0274585 | A1 | 11/2012 | Telfer et al. |
| 2013/0159068 | A1 | 6/2013 | Change et al. |
| 2013/0232344 | A1 | 9/2013 | Johnson et al. |
| 2014/0094938 | A1 | 4/2014 | Kihas |
| 2014/0274370 | A1 | 9/2014 | Shah |
| 2014/0279800 | A1 | 9/2014 | Anastasopoulos |
| 2014/0317745 | A1 | 10/2014 | Kolbitsch et al. |
| 2014/0325406 | A1 | 10/2014 | Rowe et al. |
| 2014/0335948 | A1 | 11/2014 | Jung et al. |
| 2016/0012640 | A1 | 1/2016 | Abraham |

OTHER PUBLICATIONS

Int'l Searching Authority of the PCT; Notification of Transmittal of International Search Report & Written Opinion; dated Feb. 4, 2016; Appl. No. PCT/US15/54871; pp. 1-11.

Choo Tian Fook, et al. "A Novel Approach for Addressing Extensibility Issue in Collaborative Virtual Environment," The Computer Society, Sep. 2003, pp. 1-7.

F. Breant et al., "Towards Open Virtual Environments Interoperability," 1994, pp. 1-9.

* cited by examiner

500

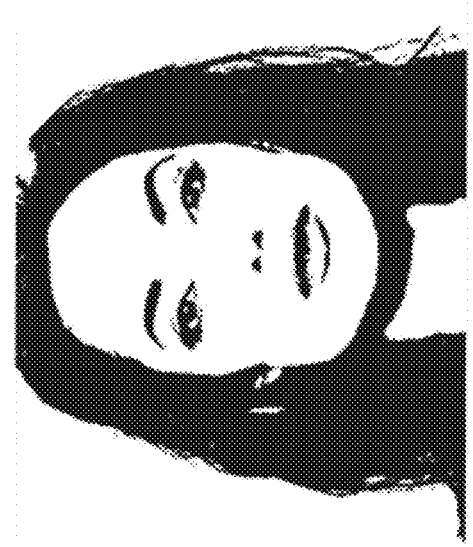
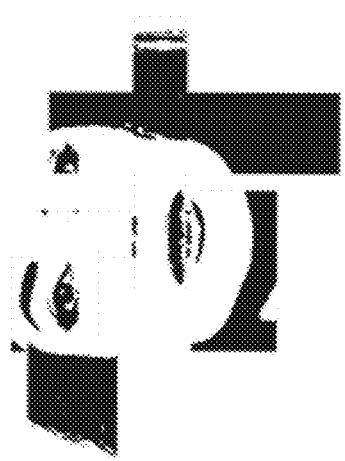
Figure 8

SYSTEM, APPARATUS AND METHODS FOR ADAPTIVE DATA TRANSPORT AND OPTIMIZATION OF APPLICATION EXECUTION

CROSS REFERENCE TO RELATED APPLICATION

This application claims the benefit of U.S. Provisional Application No. 62/062,790, entitled "System and Method for Interactive Virtual Environment," filed Oct. 10, 2014, which is incorporated herein by reference in its entirety (including the Appendix) for all purposes.

BACKGROUND

Complex systems or environments often require simulation or modeling as a way of determining costs, identifying potential sources of error, testing new design features, etc. In addition, forms of entertainment such as gaming often require similar types of resources and flexibility as that of complex system models. These resources include computational power, data storage, processes for efficient data transfer across networks, and processes to provide users with the ability to vary system or environment configurations (e.g., to change boundary conditions or constraints) in order to observe how the system or model changes.

Unfortunately, conventional systems or platforms for generating and enabling interactions with complex networks, simulations, models, or environments (including virtual environments, such as found in gaming experiences) are implemented in ways that limit their scalability, their ability to develop and incorporate learned behaviors, and their effectiveness for users as a result of latency problems when large amounts of data or content is transferred across a network.

These are important factors; for some types of systems or user experience, latency is a limiting factor. For example, virtual reality applications typically require low-latency interactions between a user and the environment in order to provide a satisfactory end user experience. However, if such an application is hosted on a remote server or platform, data transfer rates are impacted by network characteristics, resulting in a sub-optimal experience. For this reason, conventional virtual reality applications and complex simulations or models may not be able to be effectively hosted as a cloud-based service.

Conventional systems also typically fail to implement sufficient optimizations to reduce or more effectively manage CPU and/or resource consumption within a web-based or cloud platform application. This results in higher demands on platform and/or client devices and processes, and can lead to load balancing and other resource allocation problems.

Further, current Content Distribution Networks (CDN) face significant bandwidth constraints as a result of using conventional methods to handle larger volumes of data. This is partially the result of how data is stored and transferred; as a result, it is difficult to know whether information being removed from a file to reduce bandwidth constraints is important or not to the end user experience. As streaming video and other content delivery becomes more widespread, these constraints prevent the growth and adoption of business models based on those technologies.

Conventional systems and approaches also suffer from deficiencies with regards to data loss during compression, as data compression typically results in uniform data loss. This is undesirable, as lossy compression methods may not provide a satisfactory user experience on high definition displays. To minimize this problem, conventional systems may opt to perform only limited compression that does not significantly deteriorate the end user experience. However, this approach may not address the data transport issues that lead to experiencing latency when using the system.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the inventive systems, apparatuses, and methods are directed to elements and processes used to enable the generation and interaction with complex networks, simulations, models, or environments. In some embodiments, this is accomplished by use of a client-server architecture that implements processes to improve data transport efficiency (and hence network usage), reduce latency experienced by users, and optimize the performance of the network, simulation, model or environment with respect to multiple parameters.

These features of the inventive systems, apparatuses, and methods provide ways to improve the user experience when participating or interacting with an immersive virtual environment, such as a gaming environment. The features also assist in improving the operation of large scale network simulations or models (such as for transportation, communications, or computational networks) and their constituent nodes, by reducing latency and enabling the development of localized control and intelligence. Further, the features permit a more efficient way to optimize system performance in order to more rapidly evolve and improve operation of the system, model, etc.

In one embodiment, the invention is direct to a system to provide a data processing service to a client device, where the system includes:

an optimization platform communicatively coupled to a source of the data processing service and configured to perform one or more optimization processes on a data processing application that is hosted at least in part by the service, on data, or on both;

a first optimization process residing on the optimization platform and operable to identify an association between a first subset of a set of data and a second subset of the set of data;

a second optimization process residing on the optimization platform and operable to determine one or more executable instructions that are part of the data processing application and that may be executed by the client device in response to a signal received from the client device;

a data transfer process configured to provide the client device with the second subset of the set of data in response to a signal received from the client device requesting the set of data; and an application transfer process configured to provide the client device with the one or more executable instructions that are part of the data processing application and that may be executed by the client device in response to the signal received from the client device.

In another embodiment, the invention is directed to a process to reduce the latency experienced by a client device interacting with a server device, where the client and server devices are part of a common system, and where the process includes:

for a plurality of pairs of events occurring within the common system, determining a probability of occurrence between a first event of a pair and a second event of the pair;

constructing a representation of a network, the network including multiple nodes with each node representing an event occurring within the common system, wherein a transition between two nodes in the network is associated with the probability of occurrence between the event represented by a first node and the event represented by the second node;

for each of a plurality of possible events occurring within the common system and based on a state of the common system and the constructed representation, determining one or more likely states of the common system that may result in response to each of the plurality of possible events;

providing each of the one or more likely states of the common system that may result in response to each of the plurality of possible events to the client device;

operating the client device to generate one of the plurality of possible events; and based on the generated event, configuring the common system to be in the state resulting from the response to the generated event.

In yet another embodiment, the invention is directed to a process for reducing an amount of data that needs to be transferred over a network, where the process includes:

performing an optimization process that includes an associative neural network, the neural network including elements operable to determine that a first event and a second event are generated within a specified time interval;

using the associative neural network to identify an association between a first set of data elements and a second set of data elements; and providing the first set of data elements to the network.

Other objects and advantages of the present invention will be apparent to one of ordinary skill in the art upon review of the detailed description of the present invention and the included figures.

BRIEF DESCRIPTION OF THE DRAWINGS

The patent or application file contains at least one drawing executed in color. Copies of this patent application publication with color drawings(s) will be provided by the Office upon request and payment of the necessary fee.

Embodiments of the invention in accordance with the present disclosure will be described with reference to the drawings, in which:

FIG. 8 is another diagram illustrating how an embodiment of the inventive system and methods may be used to reduce the amount of data/information that must be sent over a network in order to permit a client side process to reconstruct a larger set of data/information in a manner that produces a satisfactory user experience;

Note that the same numbers are used throughout the disclosure and figures to reference like components and features.

DETAILED DESCRIPTION

Figure 1:
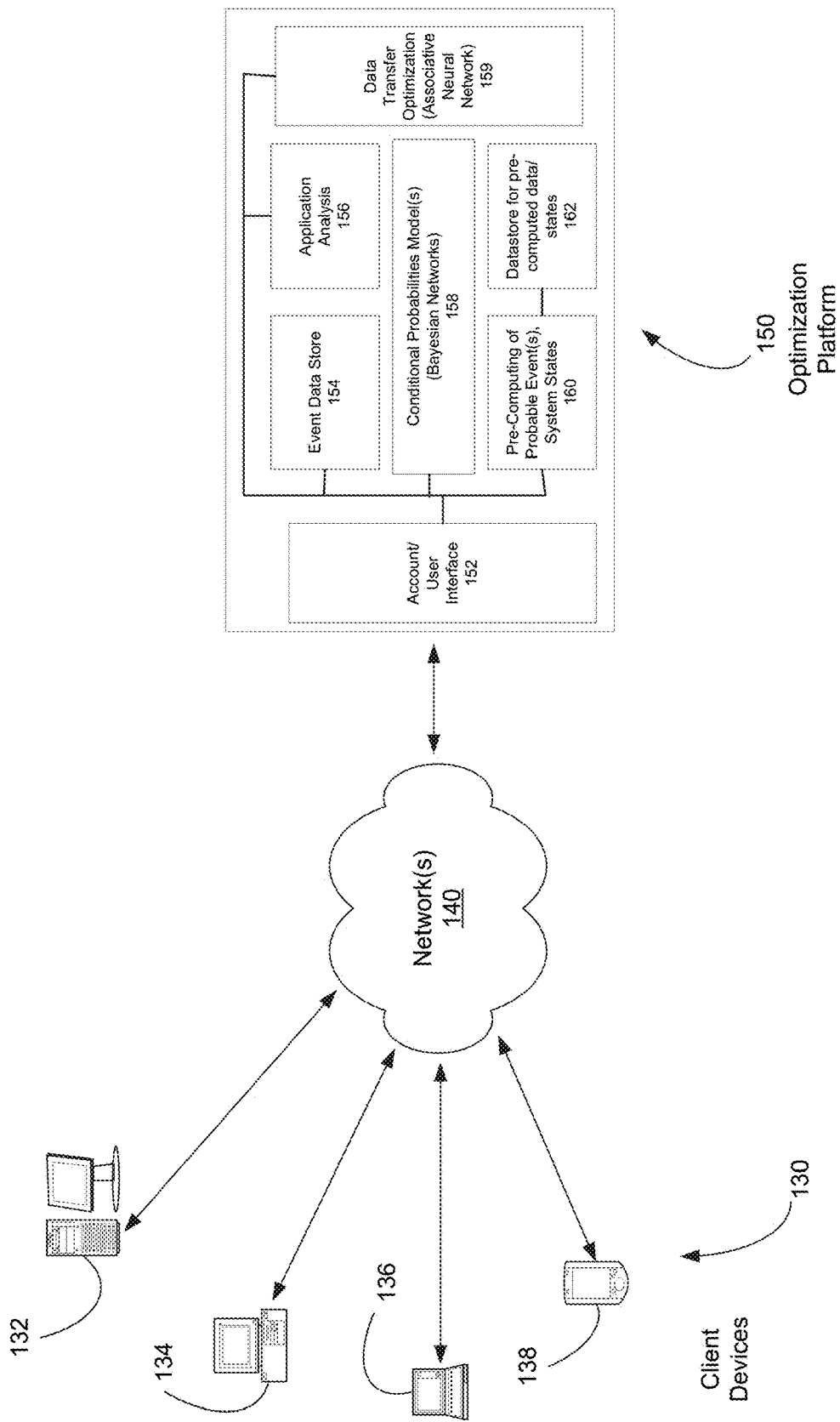
FIG. 1 is a diagram illustrating aspects of one example of a computing network architecture in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system (such as a client-server or client-platform architecture), as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Disclosed herein are inventive systems and methods that improve the performance of systems and devices in which they are implemented or with which they are utilized. These improvements may include reducing the latency perceived by a user when interacting with a software application, data processing platform, or data transfer network. In some embodiments, the inventive system and methods provide for more efficient handling of large amounts of data that are processed on a platform and/or transferred over a network (thereby reducing the demand on available computing and data transfer resources). In some embodiments, the inventive system and methods may be used to optimize the order of execution of complex software applications to provide a more satisfactory end user experience. In some embodiments, the inventive system and methods represent a sequence of events or the logic flow of an application as an operator acting on an initial state of a system to produce the next state. In this representation, the software instructions that are executed are viewed as "events" that have a defined flow based on the state of a system being controlled or impacted by the execution of the instructions.

Based on such a representation of events or program flow, the inventive methods are able to "predict" or anticipate the next likely event or events that will be generated or set of instructions that will be executed, and in response to pre-compute one or more expected next states that result from the events or execution of the instructions. These one or more expected next states are then stored. When the system detects the next event or actual instruction that is executed, it then retrieves the appropriate next state (which may be an event or the result of executing one or more application instructions). In this way, the user's perceived latency may be reduced, while also reducing the type and amount of data (such as application modules or service related logic/instructions) that might otherwise need to be transferred over a network.

In some embodiments, the inventive methods are also (or instead) able to identify associations or relationships between portions of a set of data. This may be accomplished by use of an associative neural network that can "discover" an association between one subset of data and another subset of the data. When found, such associations may be used to more efficiently transfer sufficient information to reconstruct the entire data set over a network by transferring only a subset, and relying on the knowledge of the recipient regarding the relationship between the transferred subset and the not transferred data to reconstruct the entire data set. This can be an effective way to reduce bandwidth requirements for the transfer of data that exhibits certain symmetries, follows certain rules, etc.

FIG. 1 is a diagram illustrating aspects of one example of a computing network architecture in which an embodiment of the invention may be implemented. As shown, a variety of clients 130 incorporating and/or incorporated into a variety of computing devices 132, 134, 136 and 138 may communicate with an "event prediction" or optimization system or platform 150 through one or more networks 140. For example, a client may incorporate and/or be incorporated into a client application (e.g., software) implemented at least in part by one or more of the computing devices. Examples of suitable computing devices include game consoles, personal computers, server computers, desktop computers, laptop computers, notebook computers, personal digital assistants (PDAs), smart phones, cell phones, and consumer electronic devices incorporating one or more computing device components such as one or more processors, central processing units (CPU), or controllers. Examples of suitable networks 140 include networks utilizing wired and wireless communication technologies and networks operating in accordance with any suitable networking and/or communication protocol (e.g., the Internet). One of ordinary skill in the art will recognize that other computing devices and communication networks may be used to implement the invention.

In this example architecture, the Optimization Platform 150 includes an account/user interface 152. This interface may be operable to provide registration and user authentication functions, to receive communications or data from a client side software application, and to control the accessing of event data and/or application logic data for a user or aggregate of users, and the processing/evaluation of that data. In general, interface 152 communicates with client devices 130 via network 140 and serves as a front-end to one or more functional modules (e.g., 156, 158, 160, etc.), the functionality of each of which may be implemented by a programmed processor (e.g., CPU, micro-processor, controller, etc.) executing a suitable set of software instructions. As will be described in greater detail, Optimization Platform 150 may be implemented in the form of one or more servers or other data processing elements, and may include functional modules or processes that are responsible for one or more of the following functions, operations, or processes:

Account/User Interface (module 152)—responsible for registering users or groups of users, verifying the authentication data provided by a user, accepting and/or interpreting instructions or commands from users or from user devices, and providing user access to the data and/or functionality of optimization platform 150;

Event data store (module 154)—a data storage element for data or identification of an event or sequence of events, typically indexed by user and/or account;

Application Analysis (module 156)—a process or set of processes that may be used to evaluate and analyze the flow of a software application or program, or one or a sequence of executable instructions—as described in greater detail with reference to FIGS. 3(b) and 3(c), this module is operable to analyze the flow of an application or program in terms of how the execution of an instruction or set of instructions may affect the "state" of a system that is being controlled or impacted by the application or program;

Conditional Probabilities Model(s) (Bayesian Networks) (module 158)—this function or process is responsible for considering data from event data store 154 and/or application analysis 156 to calculate the conditional probabilities between pairs of events, executable portions of an application, or pairs of states of a system that is being controlled or impacted by the application or program—from these conditional probabilities, a Bayesian network or networks may be constructed (as described in greater detail with reference to FIGS. 3(a), 3(b), 3(c), and 4);

Pre-Computation/Determination of probable resulting event(s), executed application instructions, or system state as a result of application or program execution (module 160)—this process or set of processes is operable to compute, determine, or otherwise construct the result of detecting a specific event or sequence of events, or the execution of an instruction or set of instructions contained in the application/program, where the specific event or instruction executed is one of those most likely to occur, based on analysis of the constructed Bayesian network(s);

Data store for pre-computed/determined result or end-state (module 162)—this is used to store the results of the pre-computation/determination stage, typically as indexed by the user or account; and Data Transfer Optimization Processing (module 159)—this is used to determine a subset of a data set that may be used to reconstruct the entire data set (or a satisfactory representation of the full data set)—in some embodiments, this may take the form of an associative neural network (an example of which is described with reference to FIGS. 14-16) that is capable of identifying/recognizing similarities, symmetries, or other forms of relationships between portions of a data set (such as an image, video frame, etc.) and using that information to reduce the amount of data that needs to be transferred over a network, while not compromising the user experience.

In some embodiments, the invention may be implemented within a client-server architecture, such as a system consisting of a hardware element and/or a software client (as described with reference to client device elements 130 in FIG. 1) and a server platform (as described with reference to the optimization platform, element 150 in FIG. 1). In some use cases, the optimization platform may be used to calculate/implement optimizations to improve the end user experience of participating in an immersive virtual environment or activity (such as a simulation, game, performance of a task, interaction with the development of a system over time, etc.), by one or more of:

1. Reducing the volume of data needed to deliver a high quality media/3D experience for a user or group of users;
2. Decreasing data transfer times over a network between a system platform and one or more client devices;
3. Optimizing the execution performance of online media playback, data transfer, and the execution of relatively complex applications/programs;
4. Providing design and usage patterns for use by software developers to improve their development of software applications; and
5. Reducing the amount of un-needed data reaching an end user (which can otherwise utilize resources unnecessarily, negatively impact performance, and reduce user satisfaction).

In some embodiments, one or more components or processes of the system may achieve these results by learning usage/system evolution patterns—either those of a single user or in aggregate across multiple users and/or applications, and then optimizing the performance of an application or another driver of a system (such as a state machine, applied operator, etc.). It is believed that no conventional technology can perform the tasks performed by the inventive system concurrently, or at least not while achieving the performance enhancements of the inventive system and methods. One reason for this is because the inventive system operates to optimize both data throughput (data access and transfer over a network) and application performance (as demonstrated by a reduction in execution latency) at substantially the same time.

The described program performance optimization process includes the use of predictive logic to determine (in advance of the actual need) a set of resources (or a configuration of them) that can be used to achieve maximum performance. This is valuable because in order for a program or system to interact efficiently with an end user, it is important to be able to anticipate user behavior and also to reduce the amount of data (such as content for an image, video, gaming environment, simulation, virtual environment, etc.) transferred over a network to the user, while simultaneously preserving a satisfactory experience for the user. Note that one additional benefit of reducing the amount of data transferred is that it reduces the experienced/perceived latency even further. As recognized by the inventor, in order to provide the user with the best experience, the following functions need to be executed substantially simultaneously:

1. The application, service, or program is configured to provide the needed resources at the right moment in time; to accomplish this, the inventive system and methods compute multiple paths so that when the user takes an action, the required end states or results have been pre-computed and are available (this is particularly valuable where a program or environment may have several possible evolutionary paths); and
2. The actual latency between client and server should be reduced; in embodiments of the inventive system and methods, this is done by transforming the data into a form that reduces the volume of data transmitted (without the user experience being negatively impacted) and/or by sending partial information and enabling the recipient to reconstruct the data based on experience or prior knowledge.

Note that the various optimization processes, operations, functions, or methods described herein may be implemented in any suitable form, including but not limited to hardware, firmware, software instructions that are executed by a suitably programmed processing element, programmable elements (e.g., a field-programmable-gate-array), etc. Further, these implementations may be contained in or executed in part or in whole by a server, platform, network of servers, client device, etc., with aspects or portions of the processes, operations, functions, or methods being performed on a server, on a client, or shared between a server and a client.

Figure 2:
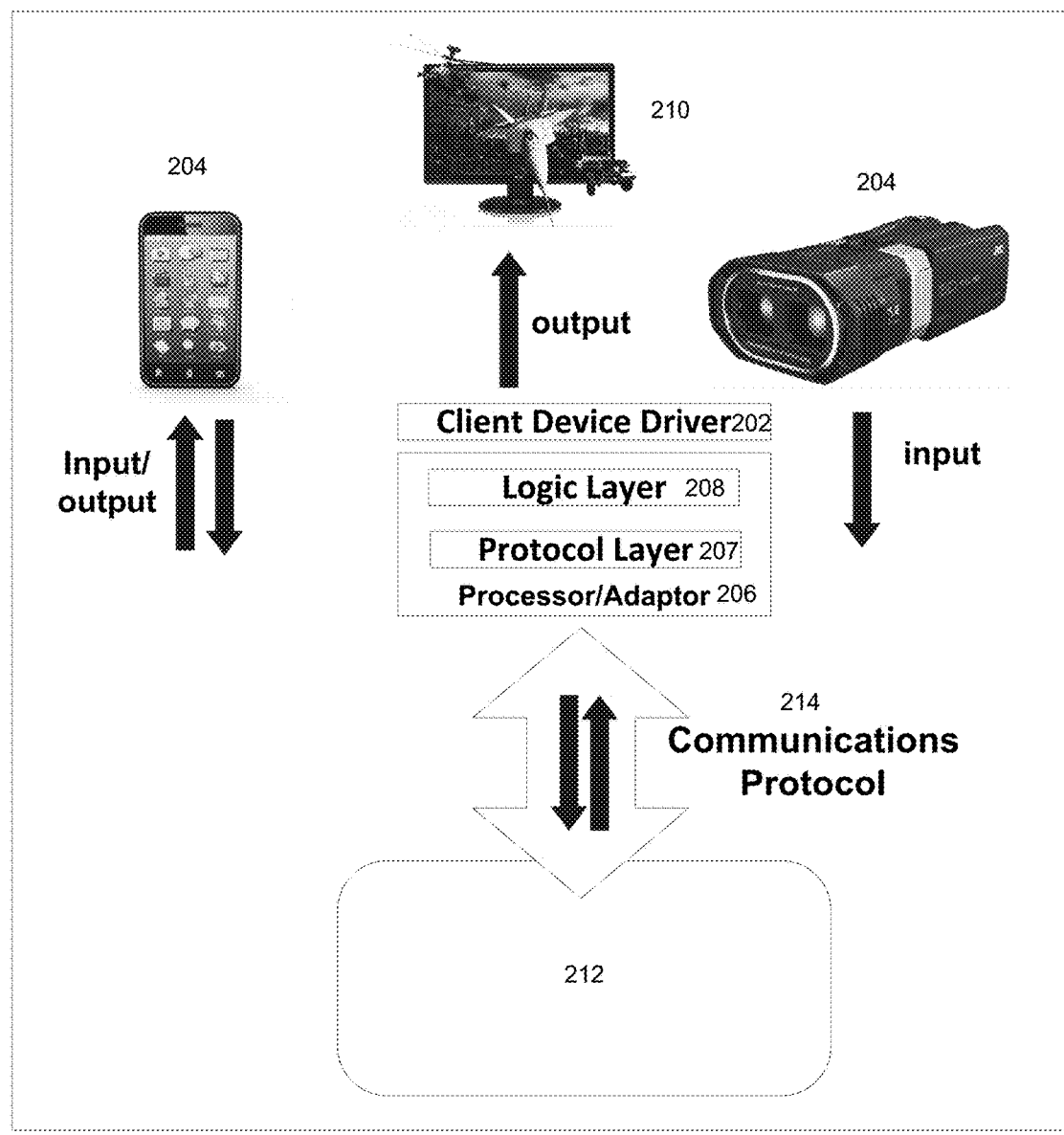
FIG. 2 is a diagram illustrating elements of one example of an environment in which an embodiment of the invention may be implemented.

In some embodiments, the inventive system, elements, and processes are based on a client-server architecture (as illustrated in FIG. 1), wherein the server platform/system processes and handles optimizations either on a per user basis, per application/program basis, or globally across an account or an aggregation of users. In the event that some or all of the inventive logic is embedded on a chip, the resulting architecture may be one such as that shown in FIG. 2. In this example, the client device driver 202 is used as an interface between the client device 204 and an embodiment of the inventive adaptor/processor 206 (or other suitable element, such as a state machine, driver, or delay-locked-loop) that is executing (or causing the execution of) a set of instructions or otherwise causing the evolution of a system, in order to implement one or more of the inventive functions, operations, or processes.

In this example embodiment, processor/adaptor 206 includes a protocol layer 207 and a logic layer 208, which enable the processor to implement the functions or capabilities used to provide the inventive services for the client device(s). The output(s) of the inventive services may be provided to a suitable output device (such as a display or viewer) 210 via the client device driver 202. The client side elements and processes communicate and exchange data with the elements, processes, and services resident on the server side of the architecture 212 using a suitable communications protocol 214.

The functions, operations, or processes that may be implemented as part of an embodiment of the inventive system may broadly be described as implementing two classes/types of optimizations; (a) application/program execution optimizations and (b) data access and data transfer optimizations. It is noted that both of these types of optimizations may assist in providing more satisfactory performance for a user by reducing perceived latency and more efficiently using system resources, including the utilization of a processor and a data transfer and/or communications network. This may be helpful in situations in which a user is accessing the services of one or more applications that are resident on a remote data processing platform and/or where the user is accessing or instructing an application to access data stored on the platform (such as business related data, media content, etc.).

As part of the inventive approach to accelerating performance within a system that communicates/transfers data using events and/or executes a resource intensive program, embodiments of the inventive system may implement a form of Bayesian caching of object behavior. In one use case, based on accumulated event data from the experience of a large numbers of users and objects, Bayesian predictive caching may be utilized to improve the timeliness and responsiveness of a system to events. In addition, as will be described, the principles behind the inventive approach to event caching may be applied to the optimization of the execution of a software program or instruction set that operates on a state of a system to generate a next state.

In terms of event modeling, Bayesian or predictive caching is based on the ability to make "predictions" as to what data will be needed or what event will occur (or is likely to occur) next and to (pre)generate and store the data, system state, or values that are most likely to be needed or used in response to those event(s) occurring. In some embodiments, a system may use this technique to reduce the flow of network traffic (thereby reducing the bandwidth needed) and/or the overhead associated with decrypting memory content by making predictions as to what would be the most likely next state or states. In the case of some embodiments of the inventive system and methods, predictive caching may be applied to events occurring within a system that are typically emitted or received by an entity. Note that from one perspective, an event occurring within a system will generally result in an action on, or transformation of the state of the system.

When an event occurs, it triggers an operation, transformation, or transition between system or environment states. If a reasonably accurate prediction can be made as to which event or events will take place next, then it is possible to pre-calculate the resulting transformation/transition and store it in memory in anticipation of the occurrence of the predicted event or events. This may be used to improve the response of the system and deliver a more seamless experience to a user. For example, suppose that Event 1 happens and this causes an action A and then, shortly thereafter, Event 2 happens, which triggers action B. Statistically, the system determines that Event 2 is relatively highly likely to occur after Event 1, which means that if Event 1 occurs, transformation B may be calculated and the resultant state stored in memory until it is needed. In such an example, the resultant state may be presented to a user more quickly than in the situation where such a "pre-computation" does not occur.

In general, there are two types of "events" that are considered by an embodiment of the inventive system and methods. The first are traditional application/program generated events. In the case of evaluating these events, an application may be instrumented along key decision branches and the events originating from these branches analyzed. These events are those with a branch identifier (most likely an instruction offset) and a timestamp. The identifier is a 64 bit value, the time sequence is a 64 bit value, and the instruction offset is a 64 bit value. Such an event is a 128 bit value that is written to a specific set of virtual registers every time a decision has been made on a given branch. These events are collected asynchronously and reconstructed into a Bayesian network (as described with reference to FIGS. 3(b), 3(c), and 4). In this example, as the client executes parts of an application, program or process, the likely alternative logic flows are loaded on the server side so that they may be delivered to the client in time for execution. Using this approach, the entire program does not need to be sent to the client—instead, only the portions or instruction sequences that the program needs to execute based on the evolution of the program logic or the system being controlled by the program are provided to the client.

Similarly, in a system that includes entities that exchange information or data using messages or another form of emitted and received events, embodiments of the inventive system and methods may be used to construct a Bayesian network of possible messages/events and their impact on the state of a system in which those events or messages are being exchanged. In this case, when an event of a certain type is detected, the inventive methods may determine the next likely set of events and pre-calculate the system state as a consequence of each of those events. This embodiment is described with reference to FIGS. 3(a) and 4.

Note that for either type of "event" and its associated network representation, the inventive system may further optimize aspects of the performance of the controlled system or environment by determining how a user will provide inputs to control a program flow, and then use that information to further reduce the set of likely/possible outcomes.

Figure 3A:
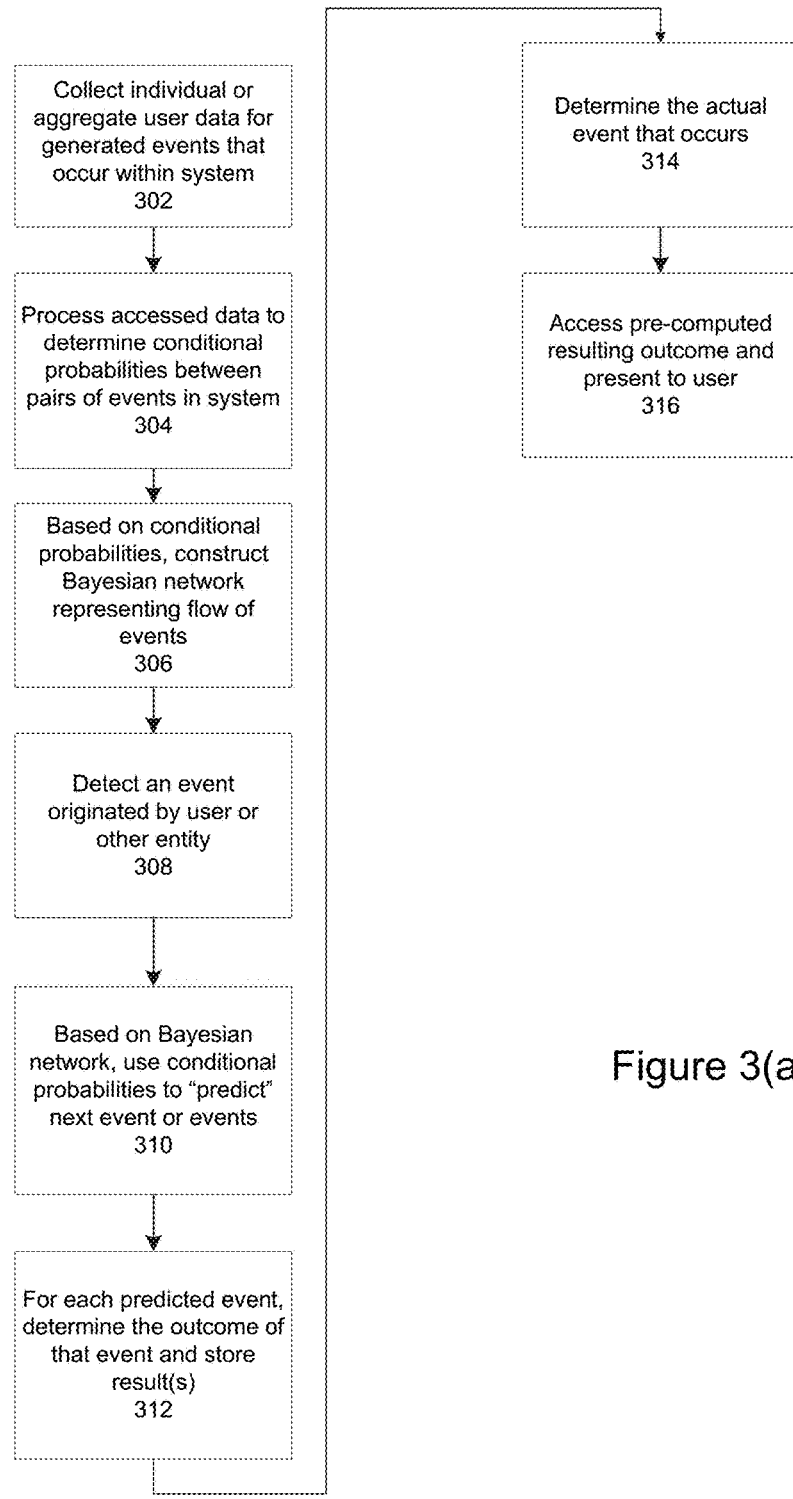
FIG. 3(a) is a flow chart or flow diagram illustrating a method, process, operation, or function that may be used to optimize the processing of events in an implementation of an embodiment of the inventive system.

FIG. 3(a) is a flow chart or flow diagram illustrating a method, process, operation, or function that may be used to optimize the processing of events in an implementation of an embodiment of the inventive system. In this method, process, operation, or function, a sequence of events is represented as an operator acting on an initial state of system to cause it to move to a next state. Note that the inventive approach is able to optimize in a way that permits transfer of a specific instruction or sequence of instructions, instead of optimization that is applied at the granularity level of a module or sub-routine.

As shown in the figure, events occurring within the system are monitored or detected. These events may include only those involving a certain node or active element, those involving a defined group of nodes (e.g., those with a specified characteristic or parameter value, those associated with a specified account, etc.), or every node, for example, as suggested by step or stage 302. The data is then processed to determine one or more conditional probabilities between pairs of events, as suggested by step or stage 304. Based on the determined conditional probabilities, a Bayesian network of connected nodes is constructed, where each node represents a state of the system, as suggested by step or stage 306 (an example of which is described in further detail with reference to FIG. 4).

Next, an event is detected, where that event was originated by a user or by another node, as suggested by step or stage 308. Using the Bayesian network model, the conditional probabilities that were determined are used to "predict" the next likely event or events, as suggested by step or stage 310. For each "predicted" event the outcome of that event is generated and stored, as suggested by step or stage 312. Note that in some embodiments, this means that the state of the system after exposure to each of the likely or predicted events is determined and stored. Next, an actual event or operation that occurs is detected and/or determined, as suggested by step or stage 314. Based on the actual event, the appropriate previously computed/determined system state is accessed and presented to the user, as suggested by step or stage 316.

In some embodiments (as described with reference to FIGS. 3(b) and 3(c)), when an application (i.e., a set or sequence of instructions) is loaded into the inventive system, it is processed by performing an analysis which evaluates the program in terms of instruction sets (e.g., Assembly). This may include placing event markers in the code around certain key instruction blocks. The program is then traced through a simulator that identifies possible execution several paths (note that the set of paths does not need to be complete). Using the execution paths/event streams, a network of "probable" event paths and system states is constructed. As a result, when a user executes the application code, the system has information regarding what the next steps in the program are likely to be, and the system is able to pre-load the instructions and pre-execute those instructions, storing the resulting state(s) in memory. This builds a precognition model for the application program.

Figure 3B:
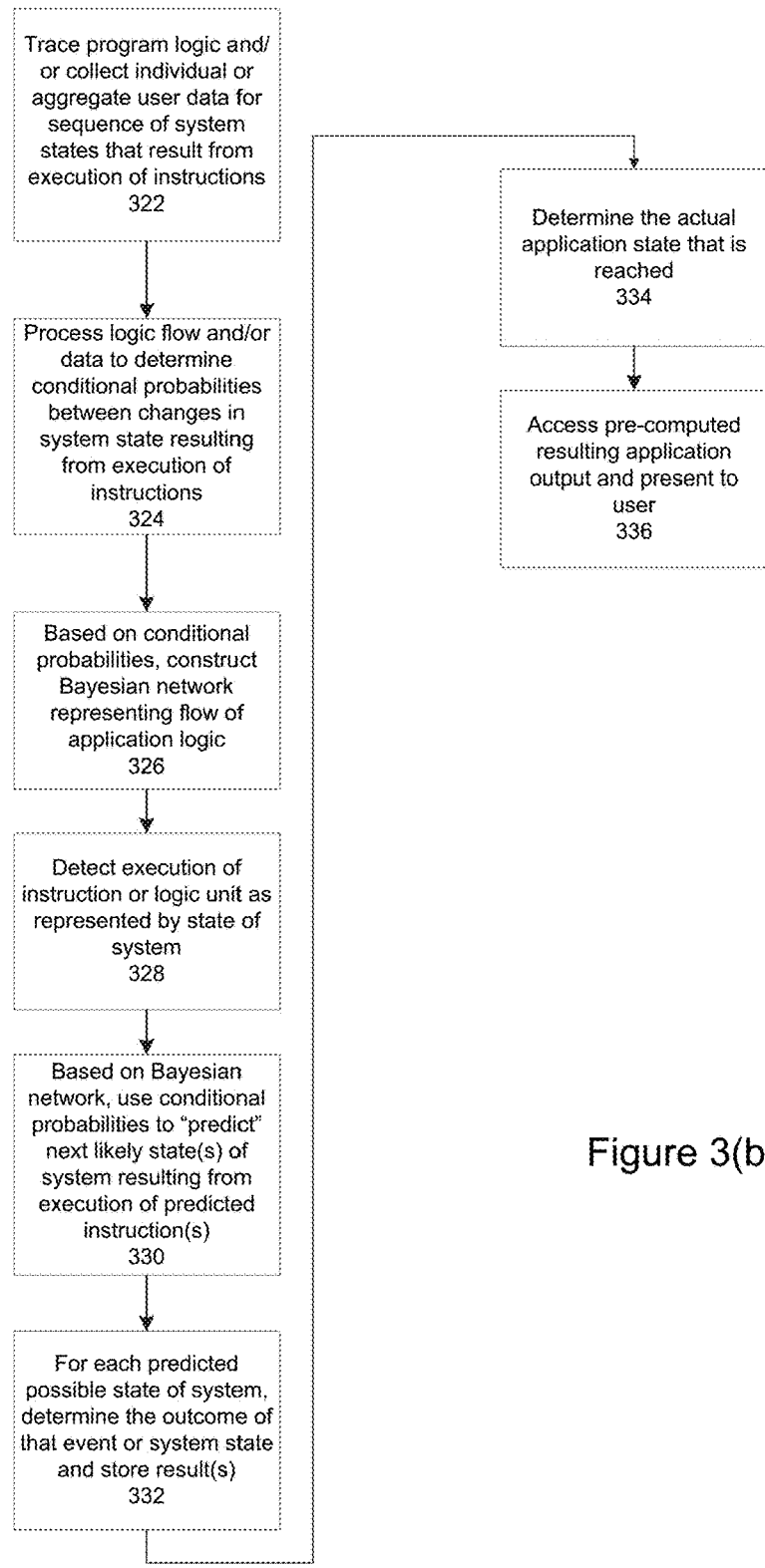
FIG. 3(b) is a flow chart or flow diagram illustrating a method, process, operation, or function that may be used to optimize the processing of a software program or sequence of executable instructions in an implementation of an embodiment of the inventive system.

FIG. 3(b) is a flow chart or flow diagram illustrating a method, process, operation, or function that may be used to optimize the execution of a set of instructions or a software program in an implementation of an embodiment of the inventive system. In this method, process, operation, or function, the result of executing one or more software instructions is represented as an operator acting on an initial state of system to cause it to move to a next state.

Initially, a software program, application, module, or sequence of instructions is evaluated to determine information about the manner in which a system under control of the program transitions from one state or set of conditions to another. In this evaluation process, the "logic" of the program or application is examined to identify branch points, decision paths, and the general "flow" of the program that results from the execution of an instruction or a sequence of instructions (such as those contained in a module or sub-routine). In some ways this is a form of tracing the logic flow of a set of instructions to understand branching behavior and how the execution of an instruction or sequence of instructions may be followed by a next instruction or sequence of instructions. This allows the inventive system and methods to develop a "model" for how control may flow through a program based on the state of the program (or of a system it is controlling or impacting) and any relevant events that occur at a given point in the execution of the program.

As shown in the figure, events (such as nodes in the execution/logic flow of a program) occurring within the system/program are monitored or detected. If monitored, these events may include only those involving a certain node in the program logic, those involving a defined group of nodes (e.g., those with a specified characteristic or parameter value, etc.), or every node, for example, as suggested by step or stage 322. The data and/or the logic flow model developed for the program is then processed to determine one or more conditional probabilities between pairs of events (such as between states of a system controlled by a program or between execution of one or more instructions and a second set of instructions), as suggested by step or stage 324. Based on the determined conditional probabilities, a Bayesian network of connected nodes is constructed, where each node represents a state of the system, as suggested by step or stage 326 (an example of which is described in further detail with reference to FIGS. 3(c) and 4).

Next, an event, execution of an instruction, etc. is detected, where that event was originated by a user or by a node in the program flow, as suggested by step or stage 328.

Using the Bayesian network model, the conditional probabilities that were determined are used to "predict" the next likely event or events (e.g., portion of the logic flow, etc.), as suggested by step or stage 330. For each "predicted" event the outcome of that event is generated and stored, as suggested by step or stage 332. Note that this means that the state of the system after exposure to each of the likely or predicted events (executed instructions, etc.) is determined and stored. Next, the actual event or operation that occurs is detected and/or determined, as suggested by step or stage 334. Based, on the actual event, the previously computed/determined system state is accessed and presented to the user, as suggested by step or stage 336.

Figure 3C:
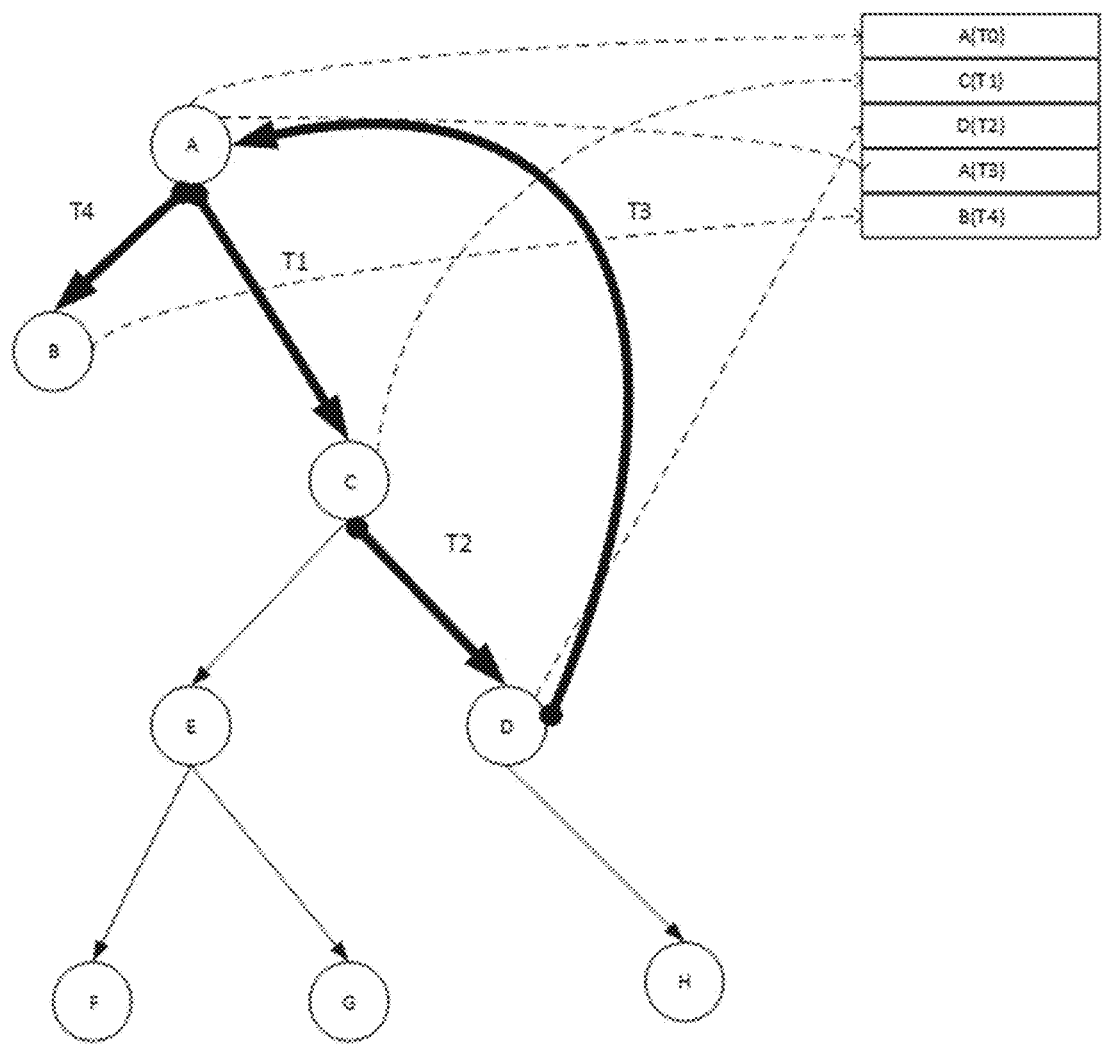
FIG. 3(c) is an example of a Bayesian network representing the "flow" of logic within a software application or set of executable instructions, and that may be used in implementing an embodiment of the inventive system and methods.

FIG. 3(c) is an example of a Bayesian network representing the "flow" of logic within a software application or set of executable instructions, and that may be used in implementing an embodiment of the inventive system and methods. As shown in the figure, the state of the program (or of a system controlled or impacted by the program), may transition from one state (e.g., "A") to another (e.g., "C") at a certain time or point in the execution. This will occur with a likelihood based on certain probabilities that can be determined (where the probabilities may depend on the initial state and other inputs to the system). By understanding the probabilities of transitions between different states of the program, one can construct a simple Markov chain. This enables the system to load multiple possible/likely pathways into memory based on calculated probabilities and when the user takes a given action, the system has already (pre) computed the results.

Figure 4:
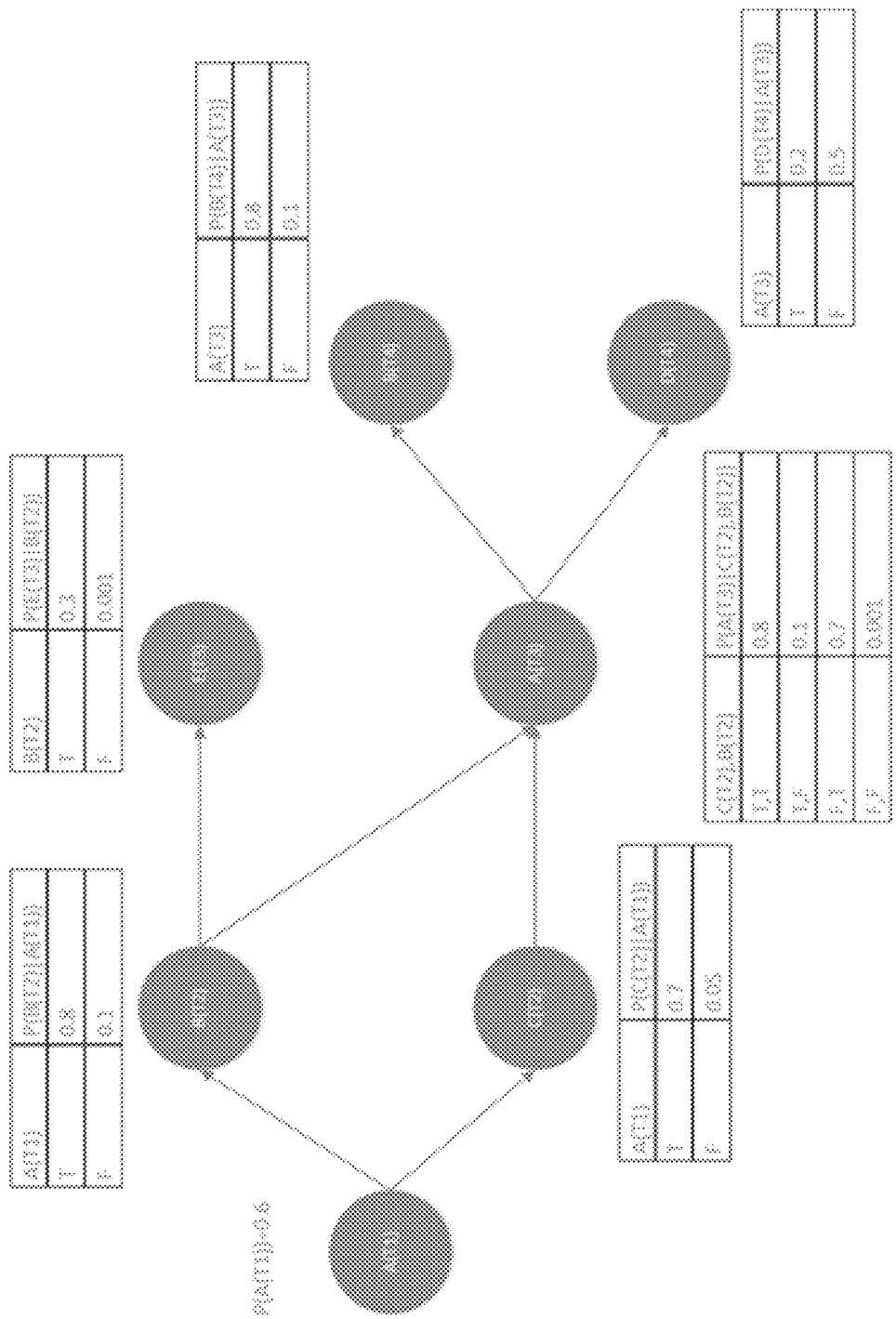
FIG. 4 is a state diagram illustrating an example of a Bayesian predictive tree that may be generated for a set of events and that may be used in implementing an embodiment of the inventive system and methods.

FIG. 4 is a state diagram illustrating one example of a Bayesian predictive tree that may be generated for a set of events, as described with reference to FIG. 3(a). In this example, assume that based on past behavior data, it is observed that if event A happens at T1, then it is highly likely that transformations B and C will occur at T2 (where B and/or C may represent operations, decisions, etc.). In such a case, an implementation of a system using this Bayesian tree may load transformations B and C into memory so that the system can more quickly provide B or C if it occurs at T2. Further, assume that the past behavioral data also show that if events B and C occur then it's likely that A will occur again at T3 and also highly likely that B will occur again at T4. Further, events E and D each have a relatively low probability of occurring. Therefore, the system stores events A, B and C in memory because it is likely that these events will occur again. Thus, the figure represents a Bayesian network illustrating conditional probabilities that might arise from a sequence of Events within a system.

Figure 18:
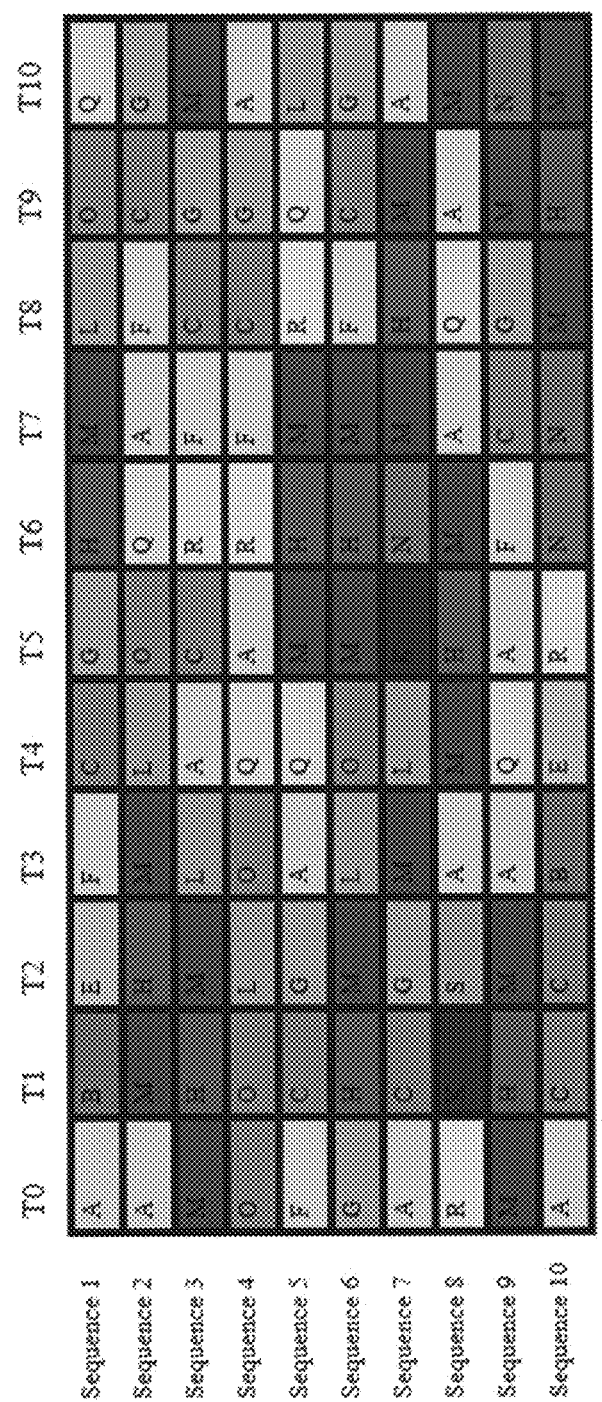
FIG. 18 is a Table illustrating an example of multiple events occurring simultaneously (in the example shown in the figure, there are ten independent threads functioning, with each thread representing a specific calculation) and how the application of a statistical analysis may permit the detection or observance of certain patterns and used to determine a likely set of transformations that a VEnv might store in memory.

As illustrated in FIG. 18, in some cases multiple events may occur simultaneously. In the example shown, there are ten independent threads functioning (with each thread representing a specific calculation—for example, components of a climate model) and each of them are capable of receiving events. From the application of a statistical analysis, certain patterns may be observed and used to determine a likely set of transformations that a system might store in memory. In the example below, the Bayesian network indicates that if the transformation set {H,M,C,G,F,A} is loaded into memory, then for over 60% of the time, the system will not need to make a network query or decrypt data even though the set represents only 30% of the possible transformations (these observations are based on a counting of events/transformations within a given time interval ΔT).

Note that typically, Bayesian networks are represented by a-cyclical (that is, non-cyclical) graphs. However, in the context of a Markov chain that is time distributed, a cyclical Bayesian network may be more effective. The reason for this is that A at time T1 is not the same object as A at time T2. So even though the graph appears cyclical, if the network is ordered by time, then it is a-cyclical.

This behavior results because normal (typical) Bayesian networks don't differentiate between something that occurs at time T1 and the same event occurring at time T2. For example, a medical expert system doesn't care about time in this regard and so an event A (person has a fever) at time T1 is the same as event A (the same person has a fever) occurring at T2. This is largely because time is not a relevant dimension in this situation. However, in the inventive system (and the applications or use cases in which it is implemented), an event A occurring at T1 is considered to be different from the same event A occurring at T2 (i.e., time is a differentiator).

Another example of an optimization process that may be applied using an embodiment of the inventive system and methods is one based on the detection of saliency (i.e., a salient feature, aspect, event, etc.). Saliency is the property of a system to recognize when something is different and hence may be indicative of an important feature or event. Note that being able to detect differences is not always simple or straight forward. For example, a child can pick out a red ball from a bunch of black balls. However, a computer may not be able to do this efficiently unless the computer understands the concepts of what is red and what is black, and that red is the uncommon item in the set.

To address this problem, the inventors have constructed a neural network that exhibits the property of saliency, i.e., it is capable of recognizing a salient event or aspect of a system. This inventive neural network is described with reference to FIGS. 14-16, which are diagrams illustrating the operation of a neural network that may be used in an implementation of an embodiment of the inventive system and methods to recognize and utilize associations between events or data. The inventive network includes an associational engine that "learns" from a system by mapping out "event" patterns based on inputs. In this sense, the network and its nodes don't have to be pre-programmed but are capable of learning on its own. If the neural network detects/observes something that does not match the patterns it has previously encountered and mapped, then it identifies the event as "different". Note that a different or uncommon event or aspect may be indicative of something of importance, of something suggesting an error, or of something that is rare but not of importance.

The inventive saliency identifying neural network is capable of detecting events within multimodal systems. For example, it's possible that a system can exist in multiple modes; in this case, the neural network can observe the development or evolution of the system and learn that the system has multiple modes because the network forms a probability mapping of the system that shows connected clusters in n-dimensional space. If the space of modes that a system can occupy is not a set of disjoint spaces but has transition paths between the spaces, then it is considered the normal behavior of the system. If a disjoint space appears, then it is inferred that the system has undergone a change. For example, suppose a system includes a set of black balls and black cubes, and one red cube. Then the set of balls and cubes, although they are different, form a non-disjoint set; the connecting property is the fact that they are black and they have counts>1 i.e. {black, cube, count>1}, {black, ball, count>1}. On the other hand the red cube exists at a point {red, cube, count=1}, which means that it is the most different as it is the least connected of the 3 sets (the others have 2 overlapping dimensions—black and count>1).

Figure 14:
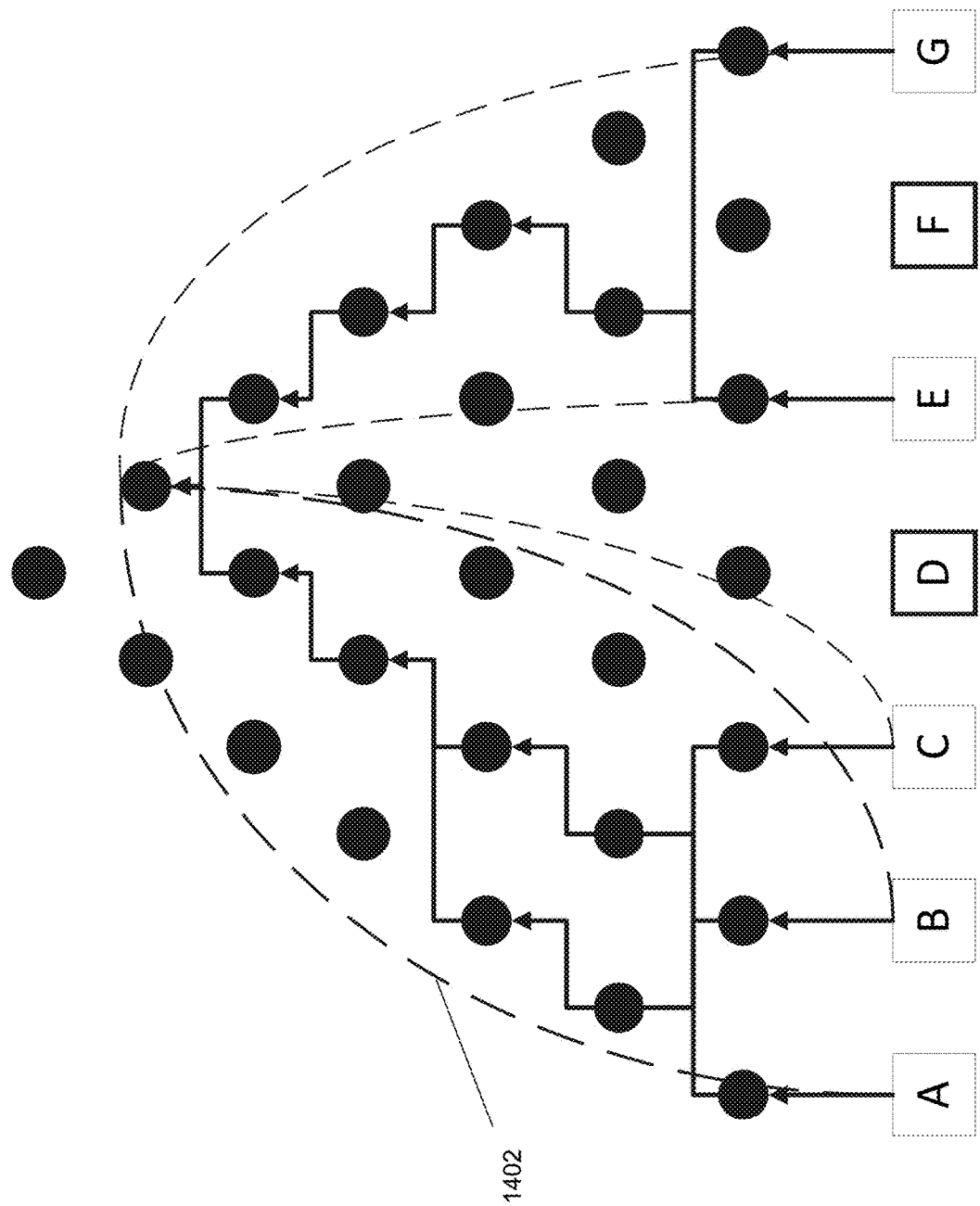
FIGS. 14-16 are diagrams illustrating the operation of a neural network that may be used in an implementation of an embodiment of the inventive system and methods to recognize and utilize associations between events or data.
Figure 15:
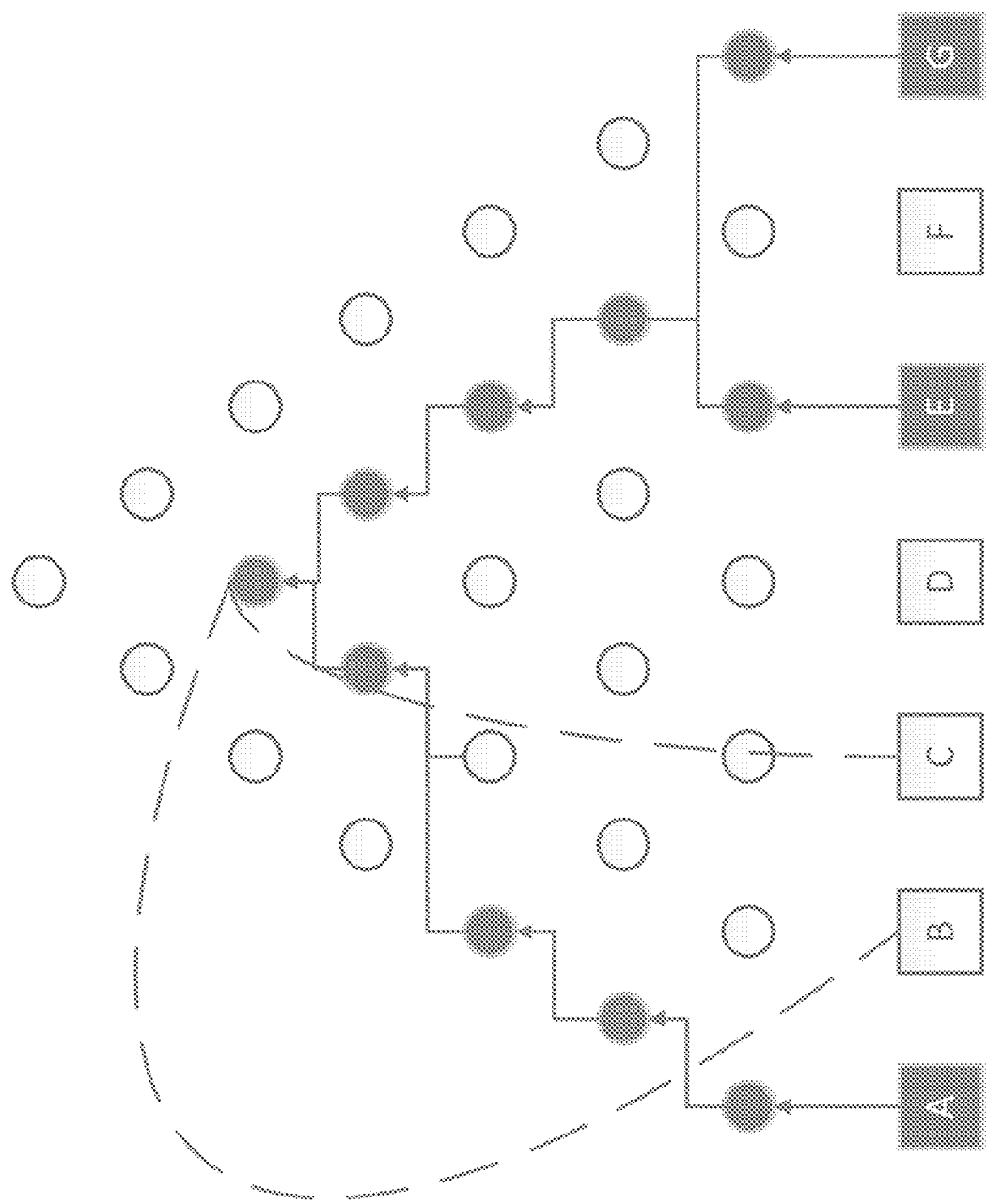
Figure 16:
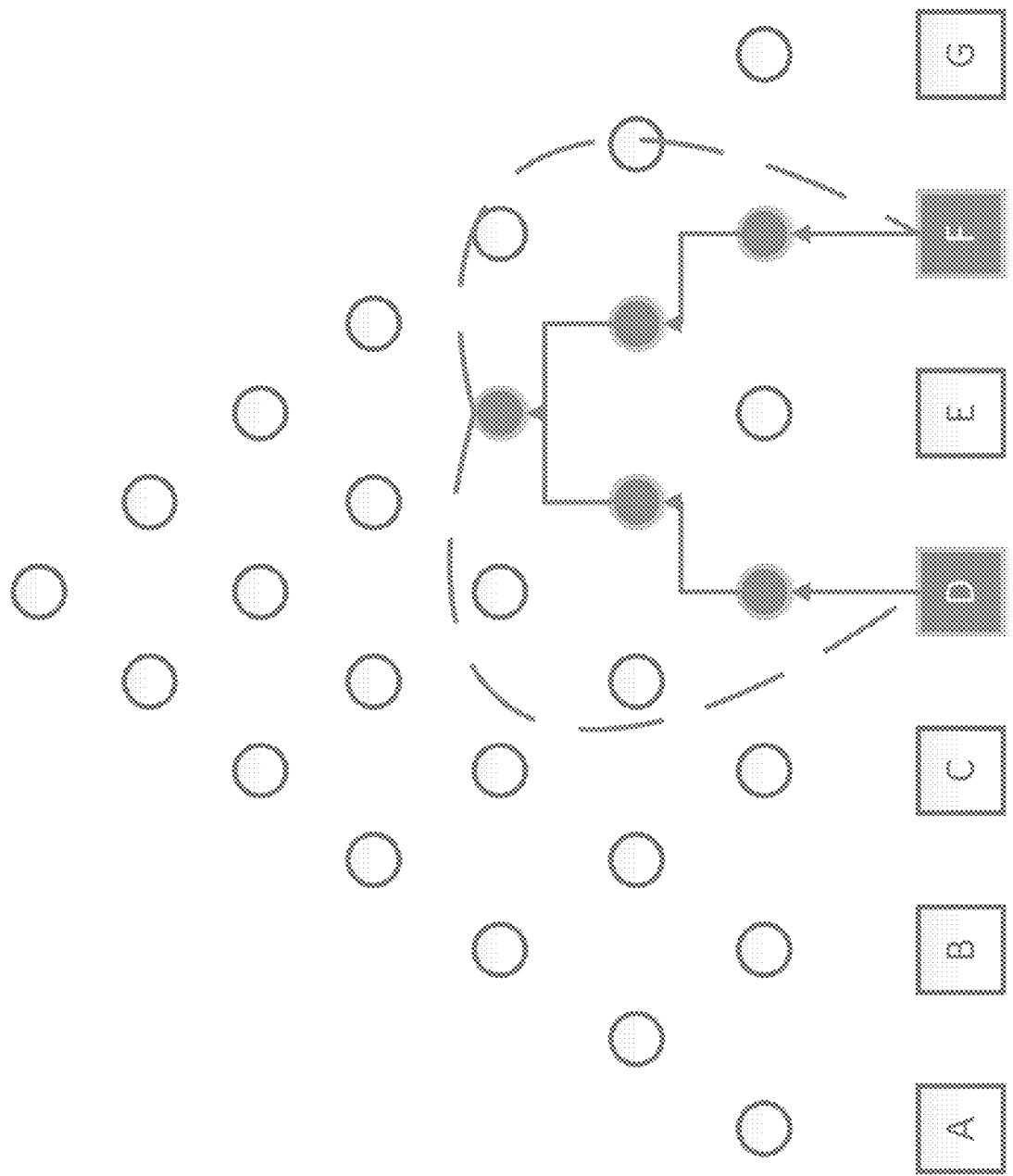

This observation is useful because the associational aspects of the neural network of FIGS. 14-16 is capable of identifying the nominal behavior of a system on its own (i.e., it does not need to be trained). For example, by understanding what an application's nominal behavior is, a system that is executing the application can pre-load data and resources to more efficiently support that behavior. If the nominal behavior changes, then the system is able to adapt. For example, if a program, service, or application has been behaving in a certain way as a result of user action and the user changes his or her behavior, then the program detects this change and modifies its operation to the new behavior. If the system did not behave in this way, then once a user changed his/her behavior any adaptation to the new user behavior might take a relatively long time (or the user would have to reset/reconfigure the program to learn the new behavior).

However, if an event or system state deviates from the nominal behavior, then the system can determine that, for example, the user's usage pattern has changed, an error is about to happen, or unexpected data has entered the system. This ability to recognize salient or uncommon/deviating events or states can be used to more efficiently allocate resources. As mentioned, if a system understands nominal behavior, then it can allocate resources accordingly. If, on the other hand, it detects a fundamental shift in behavior, then it can alert a server to allocate more resources (e.g., computational resources, data storage, error detection, backup data processing, etc.) as something unexpected is about to happen.

With regards to FIGS. 14-16, over time, associations in the network form as events occur simultaneously or near simultaneously. Recognizing this near simultaneity (and hence a possibly relevant "association") is enabled by each node having memory of a signal being fired; this is accomplished by retaining an active or "signaled" state for a short period of time, $\Delta T$. The pathways between nodes are strengthened as a result of a coordinated set of events being fired. The network is then "trained" automatically (as illustrated in FIG. 14, showing the formation of an associative pattern) and a set of recall pathways (elements 1402, the dashed lines) are formed.

Once the network has learned one or more associations between events, then when a subset of events in this pattern of events is fired, the network is able to recall the other events that are likely to be fired as a result of a feedback process (as illustrated in FIG. 15, showing an example of the Recall function); in response, the network and/or system will then allocate the resources necessary for efficient operation.

However, if the "expected" pattern changes, then new pathways (corresponding in some cases to different event or logic flow) are naturally formed (as illustrated in FIG. 16, showing how new associations are formed); this occurs without the user having to reset/retrain the system. Note that in one embodiment, the feedforward signals follow the nearest neighbor stochastic method using a discrete Gaussian distribution that is in accordance with the distribution described with reference to FIG. 6.

Another class of use cases of embodiments of the inventive system and methods (in addition to that of event sequencing or instruction execution optimization, which typically involve pre-determining a limited set of the next possible events or system states, and then (pre)computing the impact of those events or changes in system state) is that of determining the type and amount of data to transfer over a network in order to conserve bandwidth and decrease perceived latency, while providing an acceptable user experience or end result. This can be particularly important for certain types of applications such as gaming, interaction with virtual environments, distributed computing, client-server architectures that exchange data over a channel with limited bandwidth or bandwidth constraints, network models in which communications between nodes are impacted by channel limitations or channel variances, certain types of content delivery (e.g., real-time streaming of video), etc.

Embodiments of the inventive system and methods can address the need for data optimization by performing these operations or functions in one or more of several ways, depending upon the type of data being exchanged. This dependence upon the type of data is necessary because some types of data are not as easily amenable to compression without a significant loss of fidelity, for example, 3-dimensional meshes. For instance, a typical mesh can contain over 20,000 polygons. To be most effective for this type of data, a compression process needs to be applied at 3 different levels; the geometry, the topology (which describes the curvature of the mesh), and the attributes of the mesh (such as the color, texture, etc.). This necessitates dealing with a large amount of data, where the fidelity obtained after compression may depend on the category of mesh data being processed.

In some cases, an embodiment of the invention may use a mesh compression mechanism that represents an application of discrete differential geometry to determine a measure of the topology (i.e., the local curvature) of a mesh on the server side. This information is transferred to the client and then used to efficiently reconstruct certain geometrical aspects of the mesh on the client side. In this embodiment, the local curvature of a space or figure (such as a mesh used to define a 3D element) is represented by less data than would be needed to represent a portion of the space or figure in its entirety. This reduced form is transferred and then used to reconstruct the region or element on the client side based on client-side knowledge regarding the relationship between the reduced format representation and the reconstructed portion or portions. This can be used to reduce the amount of data needed to be transferred over a network while retaining the ability to utilize complex shapes as part of a simulation or virtual environment.

Embodiments of the inventive system and methods may also make use of other techniques to reduce the amount of data needing to be transferred over a network, while retaining a satisfactory user experience. In one embodiment, a specific type of neural network is constructed and utilized; an example of this neural network is described with reference to FIG. 5 (which is a diagram illustrating a neural network that may be used to reduce the amount of data that is required to be transferred over a network in an implementation of an embodiment of the inventive system and methods). The illustrated network 500 includes multiple layers 502, a feedback mechanism 504, and is massively inter-connected. Such a neural network structure may exhibit one or more of the following properties:

A layer that enables fast recall;
Multiple recall loci;
A hierarchy that allows new "memories" to form; and
A feedback loop that gives the network the ability to form connections between disparate inputs.

Figure 5:
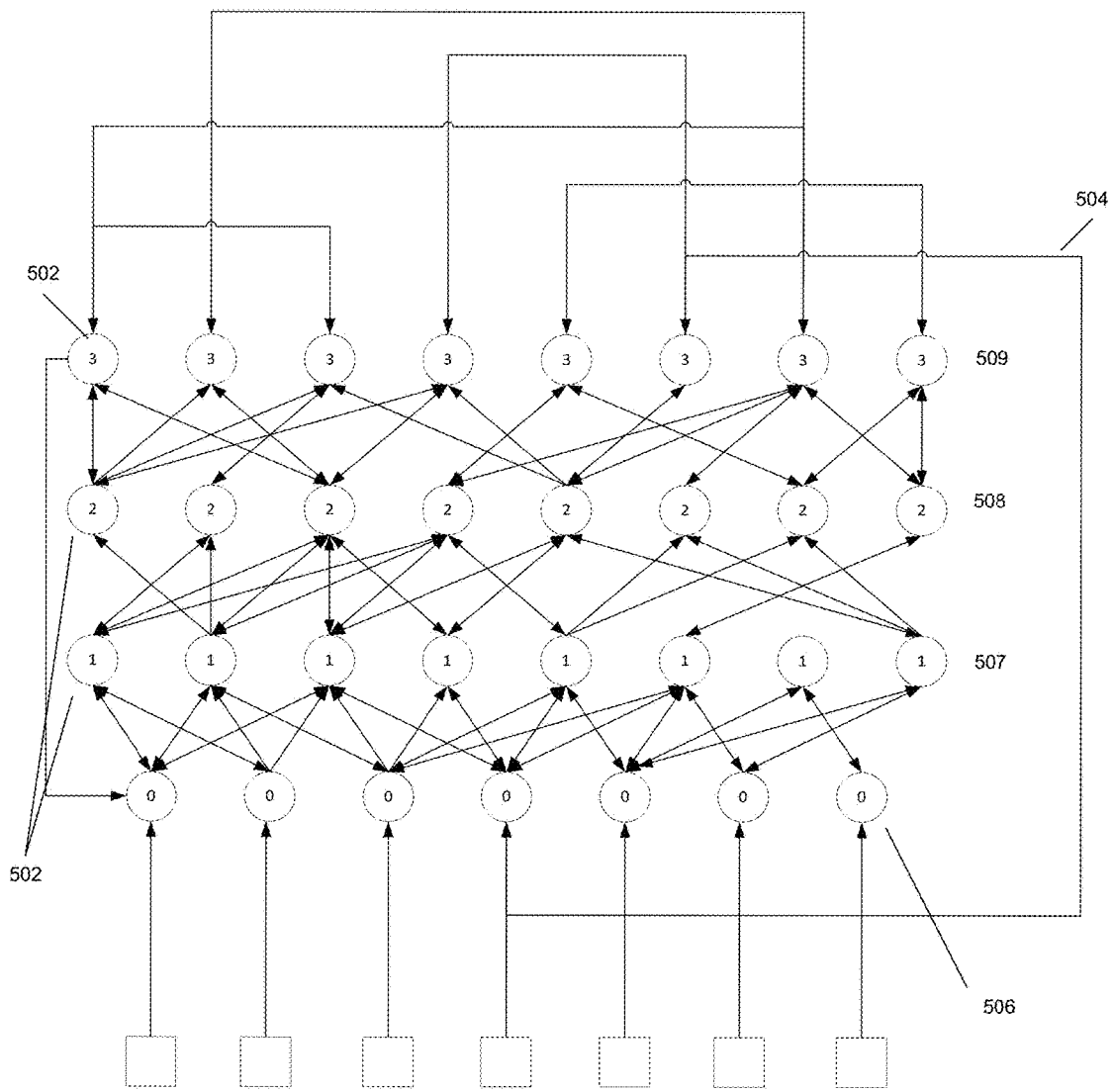
FIG. 5 is a diagram illustrating a neural network that may be used to reduce the amount of data that is required to be transferred over a network in an implementation of an embodiment of the inventive system and methods.

As recognized by the inventor, the neural network illustrated in FIG. 5 provides several important capabilities. For example, by detecting (i.e., identifying or forming) associations between seemingly unrelated aspects of a system, the network enables the reconstruction of data from partial information. Further, by allowing new "memories" to form, the network can continue to grow and learn new patterns (and thereby infer new associations or connections between initially disparate elements). In addition, the structure permits an efficient separation of the neural network into a client resident and a server resident portion. In some embodiments, the client resident portion would retain the recall information that is relevant to a specific user and which corresponds to a specific recall locus.

As mentioned, in some embodiments, the elements or layers of the neural network illustrated in FIG. 5 may be distributed between the client and the server, where the network is able to learn over time. The client side elements are responsible for obtaining or inferring information about individual users and then transferring that information to the server platform, which is then able to construct a more complex network over time.

In one example implementation, the neural network may operate in the following manner. The network includes several functional layers (502). Layer 0 (506) is the perception or input layer. Signals from Layer 0 are passed stochastically to layer 1 (507), from layer 1 to layer 2 (508), and from layer 2 to layer 3 (509). Now assume that a signal is generated by an external sensor or device. When the signal (or its processed version) passes to an n−1$^{th}$ layer of the neural network, the n−1$^{th}$ layer will pass it onto the n$^{th}$ layer. This transmission of a signal is performed as a stochastic process; the signal will be passed to the n$^{th}$ layer after weighting by a Gaussian drop-off function that is dependent on the "distance" or network metric between the nodes in the n$^{th}$ layer and the transmitting node in the n−1$^{th}$ layer. This distance measure or network metric is described further with reference to FIG. 6 (and may indicate the number of "hops" a signal takes, the number of nodes traversed, or a weighted measure of the connection between two nodes, etc.).

Figure 6:
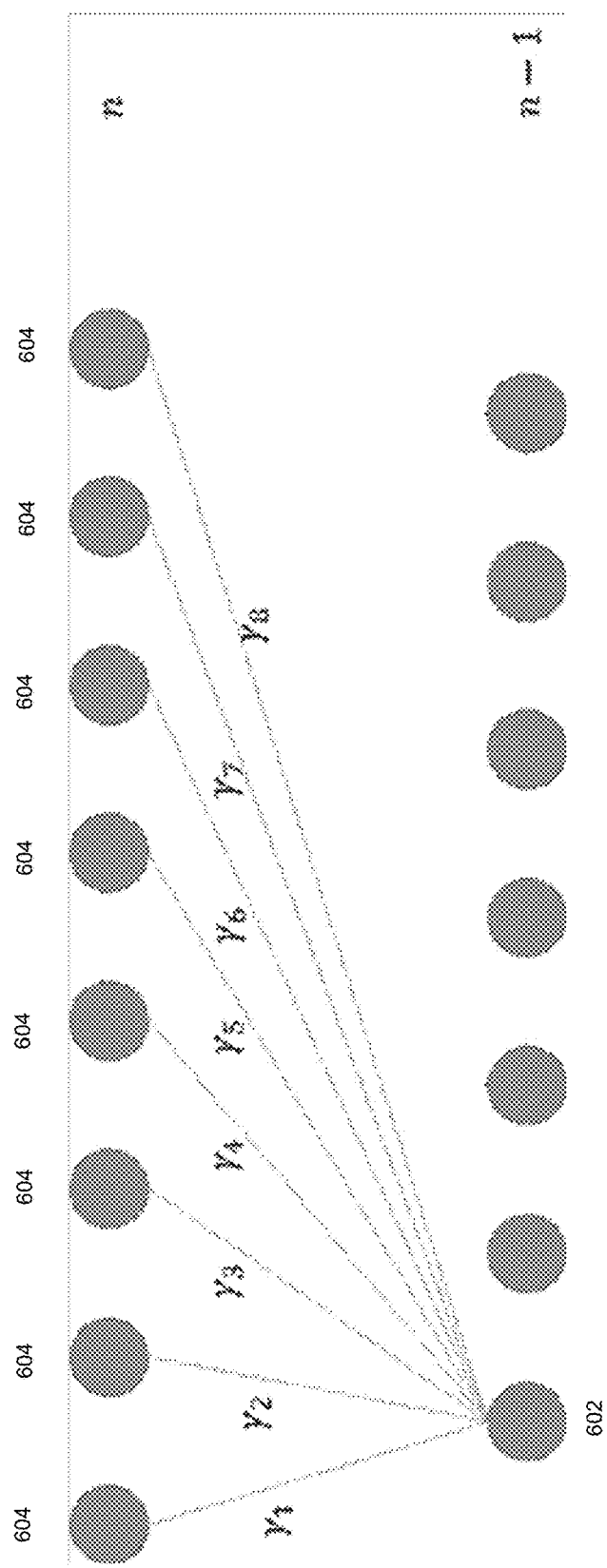
FIG. 6 is a diagram illustrating a "distance" metric that may be used to describe the allocation of nodes within the neural network of FIG. 5.

FIG. 6 is a diagram illustrating a "distance" metric that may be used to describe the allocation of nodes within the neural network of FIG. 5, and may be used in constructing and operating the neural network. In the figure, $\gamma_n$ represents the "distance" or value of a network metric between a node in layer n−1 and a node (or nodes) in layer n. In one implementation, the distances between a node (602) in layer n−1 and multiple nodes (604) in layer n may be distributed according to a discrete Gaussian distribution:

$$P_c(\gamma_n, s) \approx \exp\left(-\frac{\pi\|\gamma_n - c\|^2}{s^2}\right)$$

Further, due to the application of this weighting, if a node receives a signal from a particular node, then it will suppress signals from nearby nodes. This means that "frequent" signaling using a given path will strengthen that path relative to the other paths. Referring to FIG. 5, at the highest level, there is a stochastic connection made to adjacent nodes with the same Gaussian drop-off behavior that is used to form a connection from the n−1$^{th}$ layer to the n$^{th}$ layer. There is also a feedback mechanism from the highest node to the lowest node so that "familiar" things can be associated with new "memories". Note that the implementation and operation of such a network is similar to that described with reference to FIGS. 14-16.

In one embodiment, the 0$^{th}$ layer of the neural network (layer 506 in FIG. 5) is maintained on the client side; this enables faster recall. However, note that if the client doesn't understand or recognize an event, then it will send the signal/data to the server based layer(s). On the server side, if the server has seen the signal/data from the client previously, then other relevant data may be sent to the client.

If the server doesn't recognize the signal/data provided by the client, then it will form a new "memory". It will also associate that signal/data with other inputs arriving simultaneously or within a time window T (i.e., within a specified ΔT, which may be a factor of one or more network characteristics, user characteristics, server/platform characteristics, etc.). Note that this does not imply causality, but only that certain events are typically occurring within the same time window. This association causes frequently seen data or frequently associated events to have a relatively stronger link to each other. This results in them being returned more quickly (and often together) than more loosely associated events.

This behavior can be beneficial because if associations between events, signals, or data have been established through multiple input channels, then in some embodiments, the associated events, signals, or data are provided in advance to the client in anticipation that they will be needed at some point. For example, if a previous signal has triggered the creation of a "memory", then new data may be associated with that memory. If the association is sufficiently strong (i.e., frequent or reliable), then that memory is bound to the new data as an association. An example of this would be that if incomplete data is detected, then if the complete data has been seen before, the server will access and provide the complete data. Based on these concepts, the following scenarios may arise:

Incomplete data is received—the client has seen something like it before and "remembers/recalls" what the complete data looks like, and returns the complete data;

Incomplete data is received—the client has not seen anything like it before. The client sends that data to the server. The server has seen the data and will return the complete data, with client "remembering" this situation for the future;

Incomplete data is received—both the client and server have not seen anything like it before. In this case, the data is stored. Over time, the server builds up the complete data set (assuming that something like the data is seen again) and is then able to recall the data from incomplete bits in other cases.

This type of data handling system can be used in several valuable ways. For example, a server can operate to parse a photo, image, or other form of media, and construct a partial data block that it sends to a client. If the client has seen something like it before (i.e., it is recognized, partially recognized, or seems close/familiar), then the client may be able to reconstruct the set of data in a satisfactory manner. If the partial data block is not recognized (e.g., due to being new or insufficiently similar), then the client will make a call to the server and request the full data block. To improve the efficiency of this process, the data block may be broken into elements that are most likely to be seen again (e.g., letters, simple words, etc.). Examples of this capability to reconstruct a more complete set of data from a subset of that data will be described with reference to FIGS. 7-9.

Figure 7:
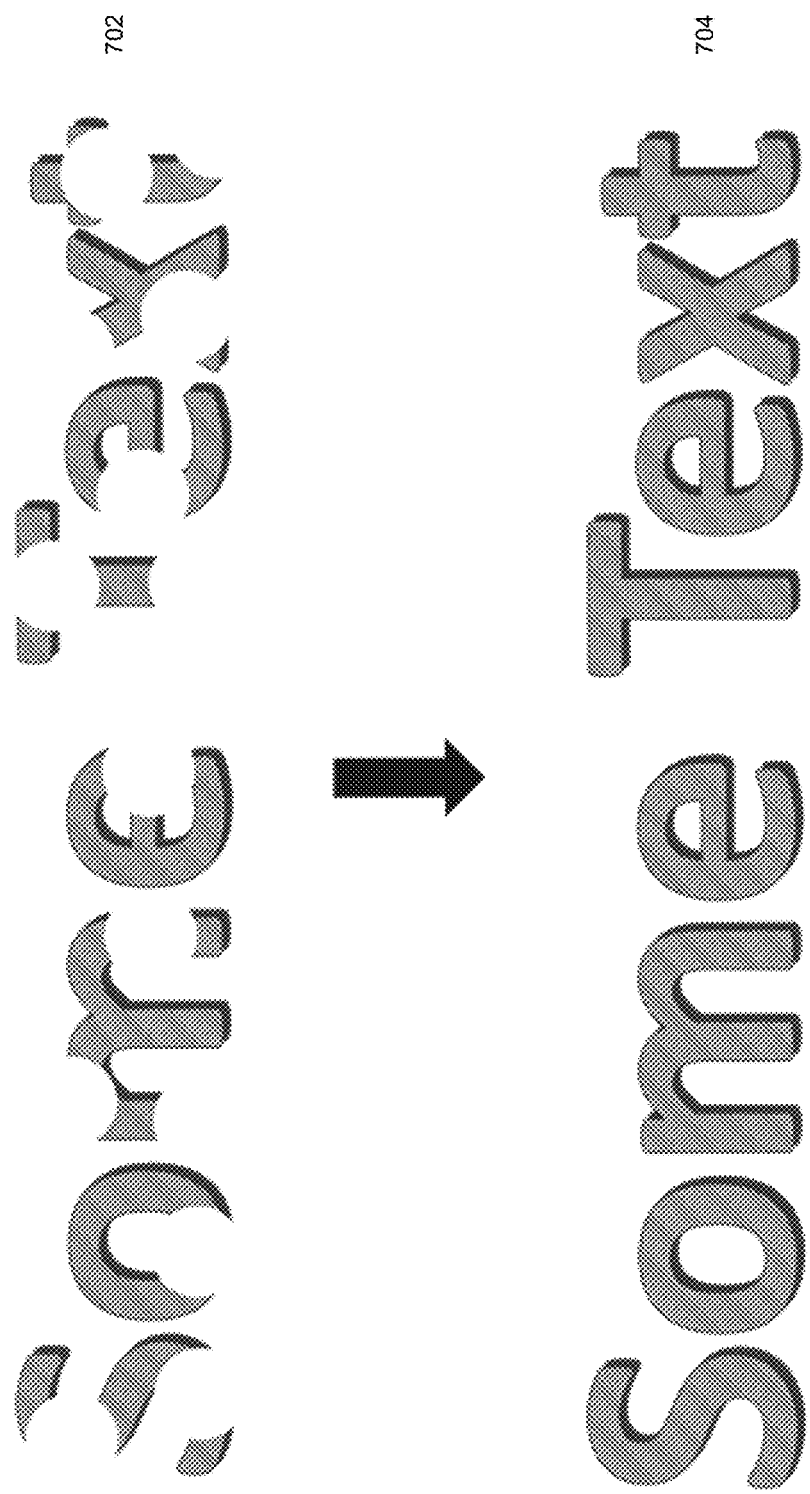
FIG. 7 is a diagram illustrating how an embodiment of the inventive system and methods may be used to reduce the amount of data/information that must be sent over a network in order to permit a client side process to reconstruct a larger set of data/information in a manner that produces a satisfactory user experience.

FIG. 7 is a diagram illustrating how an embodiment of the inventive system and methods may be used to reduce the amount of data/information that must be sent over a network in order to permit a client side process to reconstruct a larger set of data/information in a manner that produces a satisfactory user experience. As shown in the figure, in some cases the amount of data shown in image 702 (in this case, a partial image of text) may be provided from the server to the client over a suitable network. Even though the image is partial/incomplete, the client is able to construct the corresponding image shown in image 704, via application of the methods and processes described herein. For example, in this case the following process steps may be implemented to permit the client to be able to construct the full image from the partial data that it receives:

server processes original complete image;

server determines associations between portions of image (based on symmetry, similarity, tags, object types, learned relationships obtained from evaluating a larger data set, recognition of standard shapes, etc.);

server constructs data set that represents portion of full data set (and if needed, information regarding certain learned associations/symmetries), and sends partial data to client; and client receives subset of data set, and by knowing the relevant associations, reconstructs the image (at a level of fidelity which was already determined to be satisfactory).

For example, a shape may be broken up into components, such as edges, color maps, and a low resolution image (i.e., one where a substantial number of pixels have been removed). Next, an embodiment of the inventive associative network is trained based on these components. Note that if the system recognizes enough components, then it is able to recall the original with a fairly high fidelity (and one that may be satisfactory for many purposes).

To enable this process to scale effectively, the system may remember "canonical forms". It may process enough eyes to figure out some basic canonical shapes. Later, if it is presented with points that are similar to one of its canonical eyes, it is able to reconstruct the eye and then "morph" the canonical eye into a more exact shape given the available points.

The system "learns" about shape primitives and associations by looking at a set of images. It doesn't know that the shape it is considering is an eye, but instead picks up repeated patterns and uses a median value algorithm to calculate the corresponding canonical shape.

Note that there are almost always repeating shapes in a set of pictures (polygons, for example). For video, a similar method may be applied, except that a frame by frame smooth transform is used with interpolated mid points. In this way the process can skip multiple frames and still reconstruct an image sufficiently. Each frame can further be decomposed using the approach described previously with reference to FIG. 7.

Figure 17:
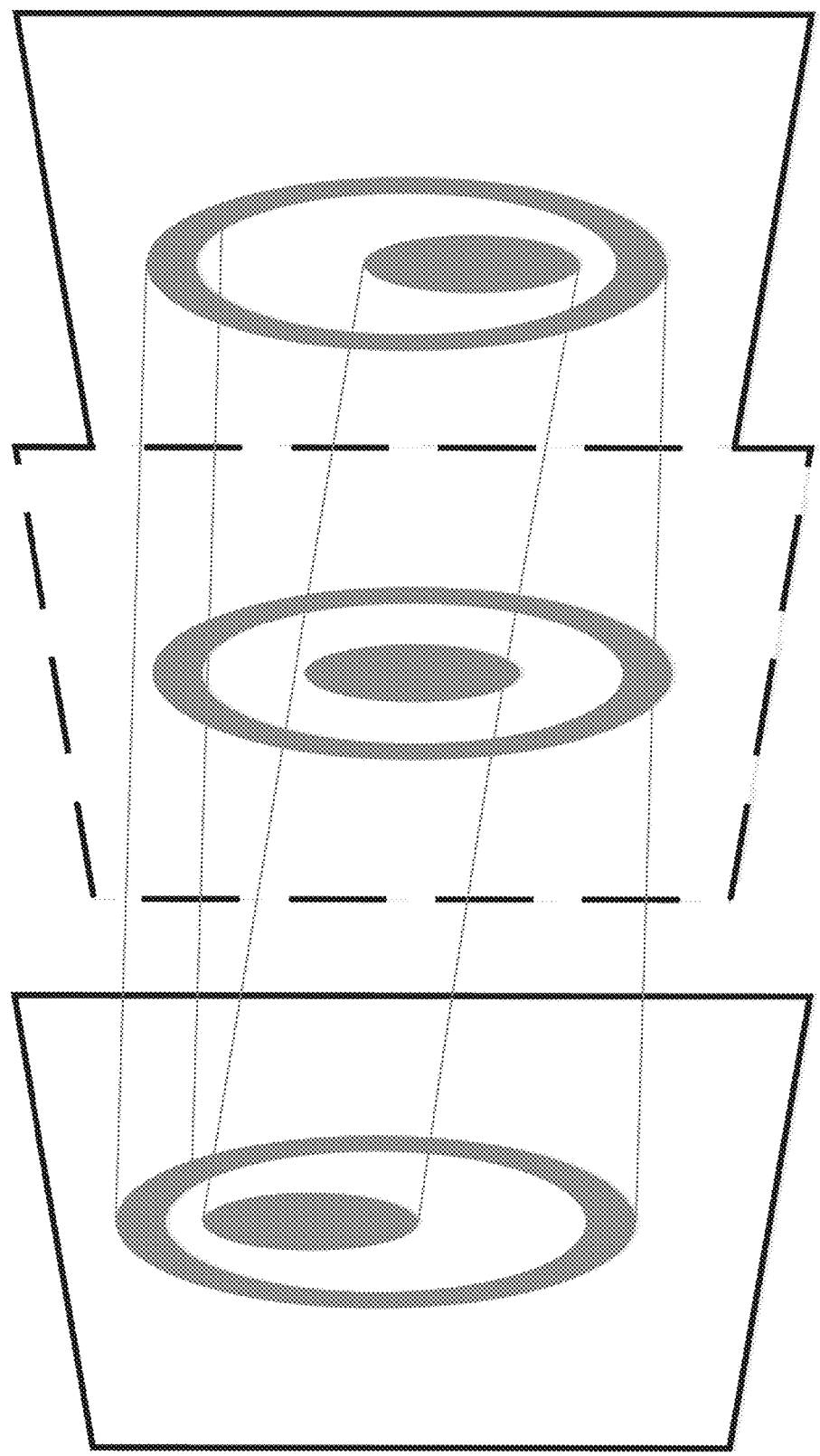
FIG. 17 is a diagram illustrating how the identification of primitives in an image may be used to reconstruct the image using less data.

One issue is that of how the system knows that two points are actually the same point in different frames. This can be determined by decomposing a first frame into known primitives and then decomposing a second frame into known primitives (as suggested by FIG. 17). It is very unlikely that two identical primitives are in close proximity, and so the system is able to map the two points to each other and thus calculate the intermediate frame. Once the mid frame has been reconstructed then it is completed by using the associative network that is described herein. The experience of the end user is to receive a stream; as the stream of data is greatly reduced, more of the movie is buffered in a given time interval. Once the stream is downloaded into the inventive adaptor, the adaptor reconstructs the video.

FIG. 8 is another diagram illustrating how an embodiment of the inventive system and methods may be used to reduce the amount of data/information that must be sent over a network in order to permit a client side process to reconstruct a larger set of data/information in a manner that produces a satisfactory user experience. As shown in the figure, in some cases the amount of data shown in image 802 (in this case, a partial image of text) may be provided from the server to the client over a suitable network. Even though the image is partial/incomplete, the client is able to construct the corresponding image shown in image 804, via application of the methods and processes described herein. In this case the process steps described with reference to FIG. 7 may be implemented to permit the client to be able to construct the full image from the partial data that it receives.

Figure 9:
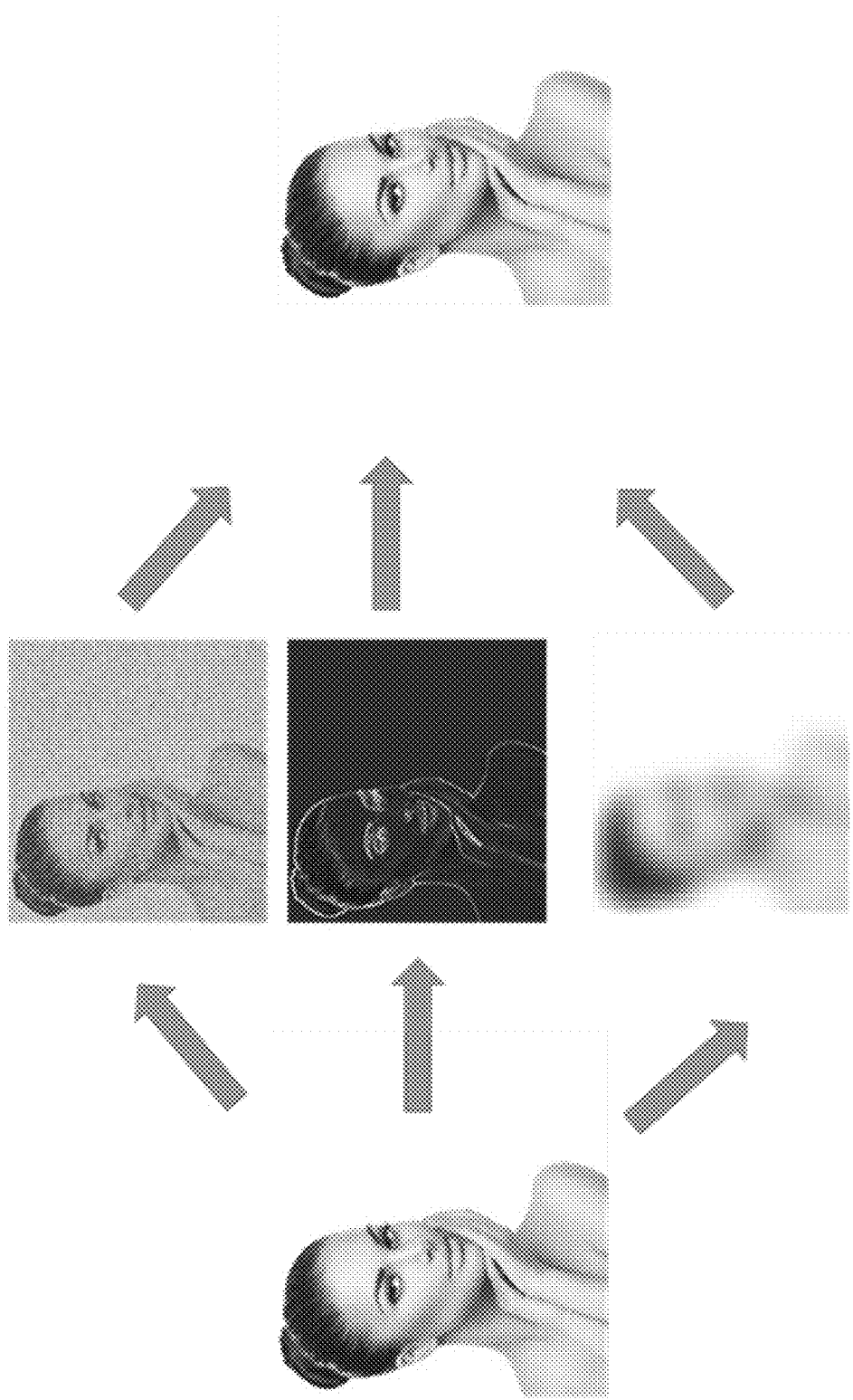
FIG. 9 is yet another diagram illustrating how an embodiment of the inventive system and methods may be used to reduce the amount of data/information that must be sent over a network in order to permit a client side process to reconstruct a larger set of data/information in a manner that produces a satisfactory user experience.

FIG. 9 is yet another diagram illustrating how an embodiment of the inventive system and methods may be used to reduce the amount of data/information that must be sent over a network in order to permit a client side process to reconstruct a larger set of data/information in a manner that produces a satisfactory user experience. As shown, more complex reconstructions of an image might be implemented by keeping edge, pixel, and color primitives on the client; this would allow the client to infer the complete image without having seen the original image.

One technique for this is to decompose the image instead of using primitives. Using a base smoothed color map taken by calculating the average of a set of points and a reduced image (obtained removing a large number of pixels), as well as a set of edges that describe shapes in the image, the system smooths out areas that don't vary much based on the edge map (i.e., areas that don't show many edges). Regions with a relatively large number of edges are kept more or less intact in the reduced image, as the system assumes that those areas are detailed and removing pixels will be more noticeable. In areas with no edges, the system can remove a number of pixels and reconstruct the image based on the "chunking" method described next. The color map and the reduced image map allow the system to interpolate colors of pixels between known pixels. As areas near edges are highly defined, this allows the system to color adjust those points adjacent to the highly defined areas; the resulting color adjustment cascades through the rest of the image and results in an image where the colors are very similar to the original image.

In some embodiments, data optimizations may be used that operate to partition or "chunk" data on the client side into data sequences or "memes", and to store this information in a table that is shared with the server. After such a table or list is shared with the server, when the server sends data to the client, it may first lookup the shared data meme table and replace one or more data memes in the data set that it was planning to send to the client with the applicable address offsets from the table. In one embodiment, the data memes may be determined or identified probabilistically, such as by use of a Bayesian network constructed from a timer-ordered sequence of events (examples of which have been described herein). In this use, the client might periodically update the server as the meme table is updated or revised.

Figure 10:
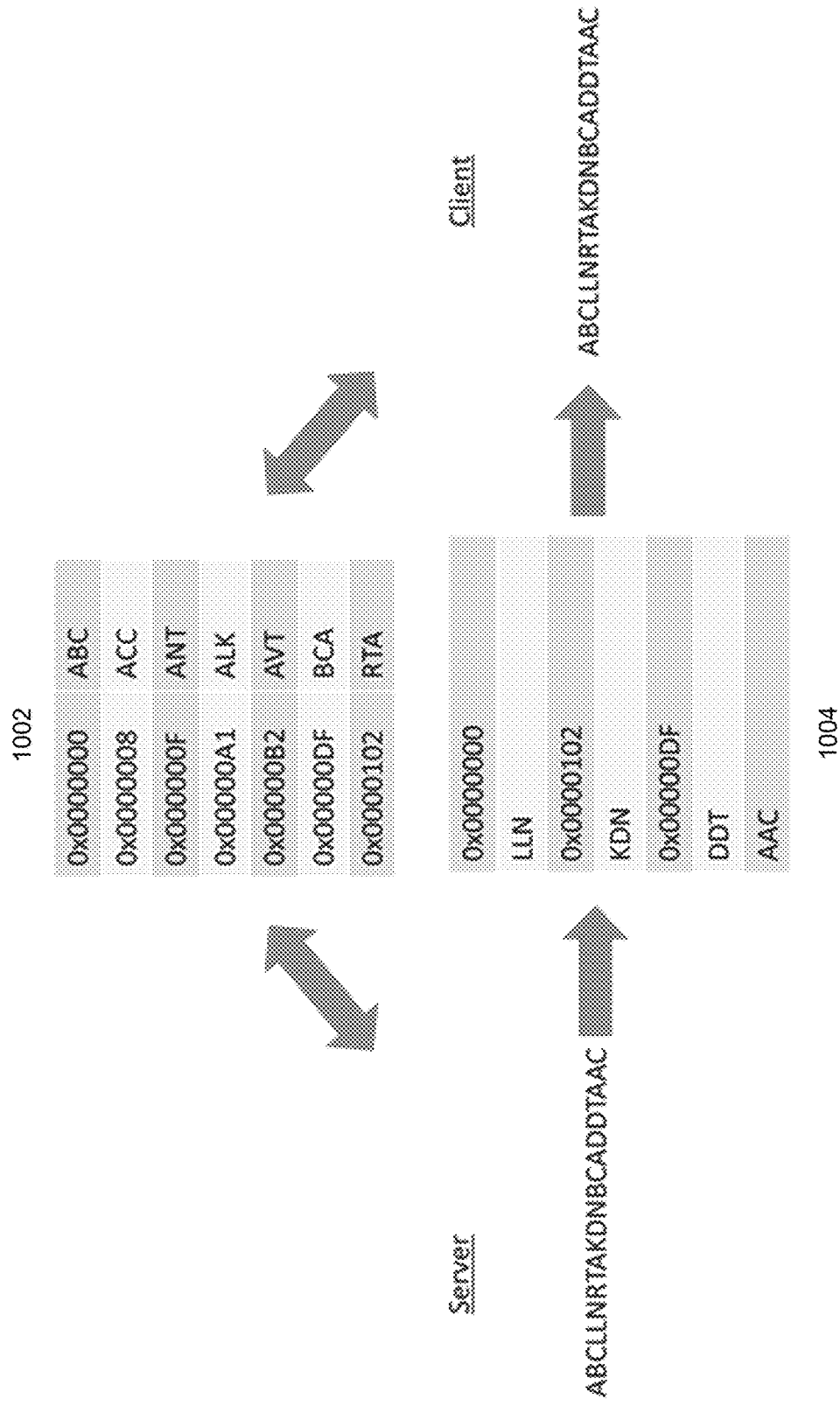
FIG. 10 is a diagram illustrating the process flow for implementing an embodiment of the inventive system and methods which reduces the amount of data that is required to be transferred over a network based on recognizing certain common data sequences or "memes"

In such a situation, the process flow might appear as shown in FIG. 10. As a result of having a shared data table (in this case the data meme table), event message sizes can be decreased by replacing certain data sequences by a pointer to a data sequence stored in the data table, and specifically sending data where such a pointer does not exist. Thus, in the example shown in FIG. 10, the server will perform a lookup in the shared table (1002), replace the appropriate sequences with pointers to locations in the table (1004), and then send the reduced sized event (consisting of the addresses of pointers to recognized memes and actual data for new memes) to the client.

As shown or suggested in the figure, data may be analyzed on a client and/or on a server. Common memes are identified based on building a probability table. Memes that are relatively highly likely to arise are kept in a shared table with known offsets. When one of these likely memes is encountered in a stream of data that is going to be transmitted, it is replaced by a pointer to the entry in the shared table. An example is that in the English language, some words are more likely to occur such as "the". Instead of sending the whole word, a pointer to the location in the table is sent, and as the table is shared between client and server, the original word is able to be re-inserted. The shared table may be refreshed periodically, as the most likely memes may change.

In some embodiments, aspects of the inventive system and methods may be used to enable more efficient interaction of a user's device with a system or platform that is hosting a simulation, model, or virtual environment, for example. This can be accomplished by use of an "adaptor" that operates to couple a user's data input device to a remote server or data processing platform, while providing mechanisms for the efficient exchange of data and messages between the user's device and the platform over a network. A description of one or more implementations of such an adaptor will be described with reference to FIGS. 11 and 12.

Communications and data exchange between a client process and the processes on a server/platform may be accomplished using a client device that is optimized for high bandwidth communications, computationally intensive operations, and portability. In some examples, a server/platform may provide a universal I/O and computational layer that enables distributed computation and I/O across multiple machines spanning multiple physical locations. Examples of the types of devices that may be used as part of the inventive system include tablets, smart phones, desktop computers, laptops computers, gaming consoles and 3D visors. In some cases, the adaptor may be a separate hardware device connected to a computing device, and in other cases the adaptor may be a software program or a component of a software program executing on a computing device.

Figure 11:
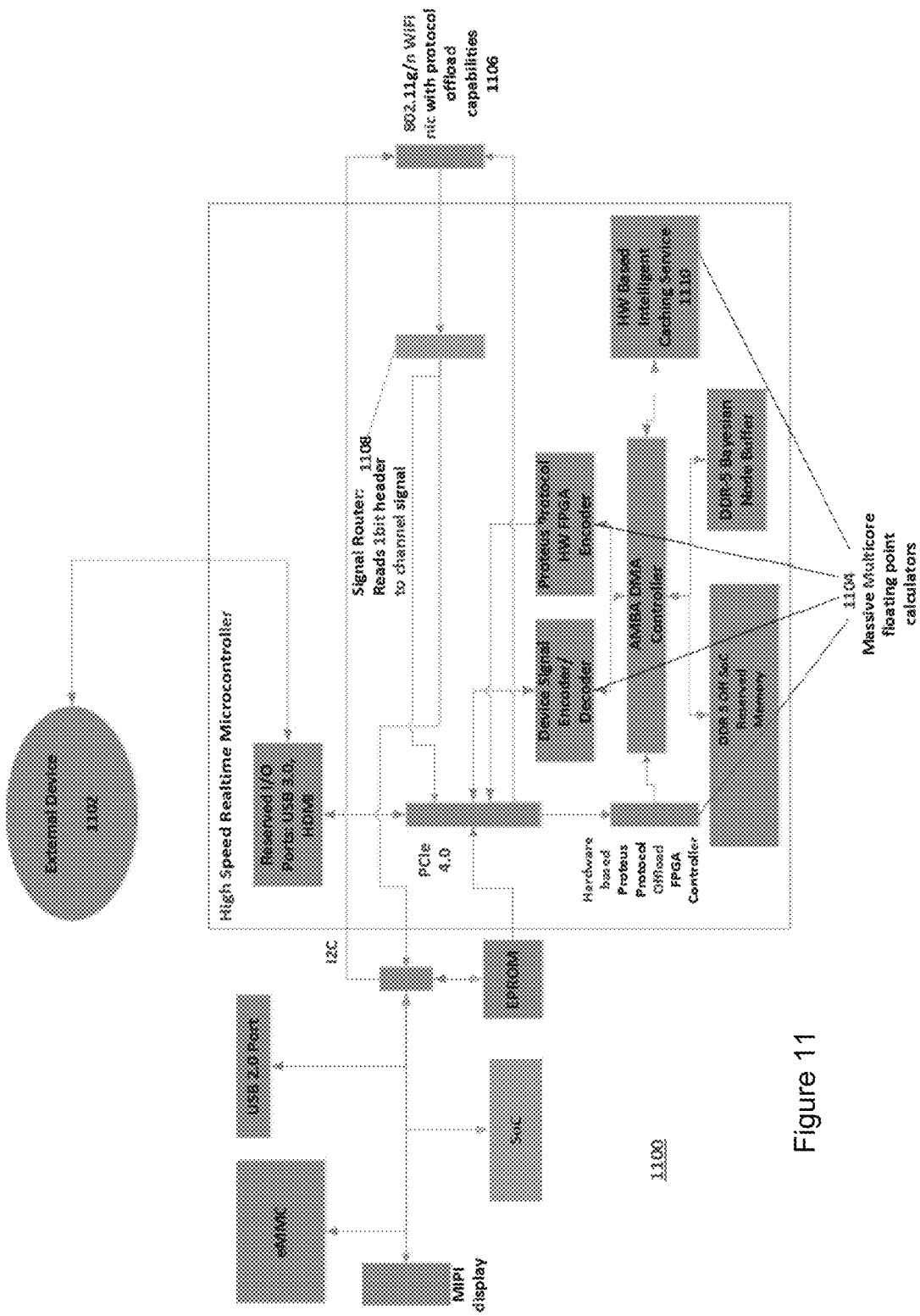
FIG. 11 is a diagram showing certain elements or processes of an example adaptor device 1100 for providing an interface between an external user device 1102 and a data processing server or platform executing one or more of the inventive optimization methods.

FIG. 11 is a diagram showing certain elements or processes of an example adaptor device 1100 for providing an interface between an external user device 1102 and a data processing server or platform executing one or more of the inventive optimization methods. The illustrated adaptor device utilizes multiple multicore floating point calculators 1104 to accelerate the processing of signals between the external device 1102 and the system platform. For example, signal routing may be implemented by the adaptor, wherein incoming packets on a Wi-Fi NIC 1106 are monitored by a signal router 1108 that looks for a flag or signal bit that causes data packets to be diverted to specialized hardware configured for device signal encoding/decoding.

In the illustrated example, the adaptor 1100 includes an embedded Bayesian intelligent caching service 1110 (such as that described with reference to FIGS. 3(*c*) and 4, or other predictive pattern matching based process or service) for use in predictive processing and/or optimization operations. The Bayesian network may be configured to be updatable from the server/platform in order to obtain Bayesian network data from a larger (i.e., aggregate) dataset, such as one based on data for multiple users or accounts. Predictive processing may be used to reduce perceived latency and improve the user experience, such as by downloading partial images or data sets in advance of a time when they will be needed based on predictions of the data that might be used (e.g., based on past activity for a game or for a user).

Note that predictive data/resource allocation may utilize considerations of saliency to allocate additional resources for processing signal activity. For example, if activity in a system deviates from established patterns (suggesting that it might be more relevant in that situation), then an unsupervised learning system can operate to recognize the activity/deviation and generate requests for additional resources to process the new activity.

In contrast, conventional systems typically reside on a local device and utilize an assumed Poisson distribution for generating predictions. Other conventional implementations may be reactionary and allocate resources in response to a spike in usage instead of anticipating the increased need for resources; this approach can result in greater latency. However, the predictive approaches used in some embodiments of the inventive system and methods may utilize self-learning for intelligent resource allocation in order to increase the performance of a cloud architecture for hosting a virtual environment, as well as support scalability and more efficient use of resources.

Referring to FIG. 11, an embodiment of the inventive adaptor may include a network adaptor and a high speed bus connection to a processing element that contains a coordinator that makes decisions regarding the encoding system used with the incoming data. The coordinator may utilize a number of methods at its disposal and can offload the computation to a floating point calculator (which could be an external GPU). The algorithms may be updated periodically using an FPGA based controller that is able to adjust some of the algorithms or add new ones that make use of common resources, such as the associative network subsystem and Bayesian subsystem.

Figure 12:
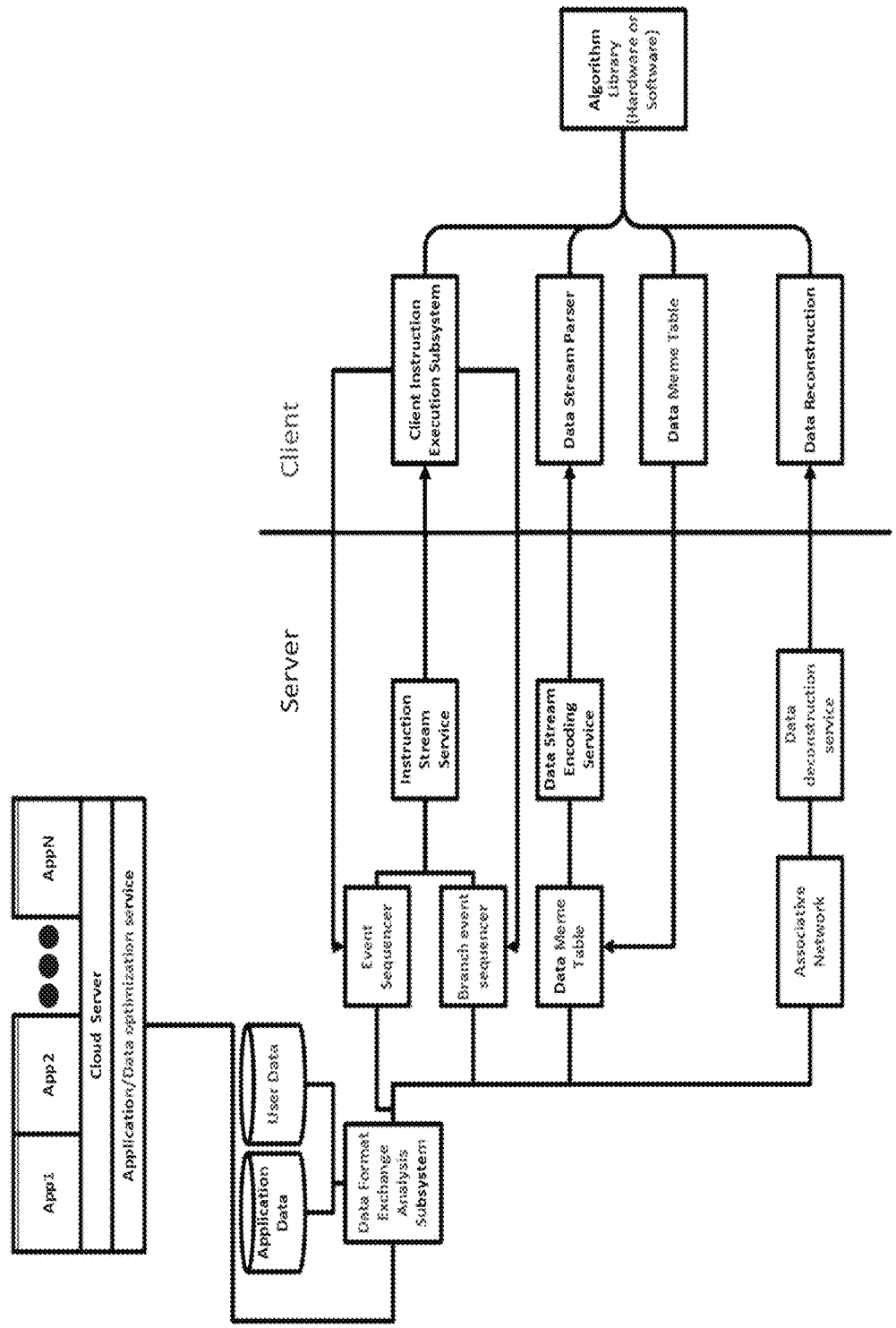
FIG. 12 is a diagram illustrating how a data processing server or platform may be integrated with an embodiment of the inventive optimization methods (as implemented in an adaptor) in order to provide a user with an improved experience when transferring relatively large amounts of data over a network.

As a further example, FIG. 12 is a diagram illustrating how a data processing server or platform may be integrated with an embodiment of the inventive optimization methods (as implemented in an adaptor) in order to provide a user with an improved experience when transferring relatively large amounts of data over a network. The figure shows an architecture where an application or service is hosted on a server. The application may be part of a data processing service (such as for a business function), a gaming experience, a simulation, a system model, etc. The server/platform communicates with an engine that processes incoming data into application data or user specific data (data that the system has learned from specific users). Note that the incoming data could also be video, 3D mesh structures, etc. These are stored in the application database. When the data is sent to the client, it may use one or more of the optimization methods described herein (e.g., a shared meme table, Bayesian analysis engine, image reconstruction engine using an associative neural network, space or shape curvature analysis, etc.). A corresponding element on the client side enables the data to be reconstructed if needed.

As described, the inventive adaptors enable devices and people to interact with a virtual environment, system model, or simulation (and with virtual entities) in an effective and efficient manner. These are needed as viewing high fidelity content (such as a virtual reality environment) is currently unfeasible unless the content is downloaded ahead of time. This restricts certain types of real-time behavior as it is not possible to update the content frequently enough for a satisfactory user experience. In some cases, such as a gaming environment, this may not be a serious problem, but in scenarios where the object(s) being viewed are updated continuously (such as a simulation, system model, or virtual landscape), this can pose serious limitations.

As described, the inventive adaptors provide a solution to this problem through implementation of one or more of several mechanisms and processes:

Logic that "predicts" (i.e., attempts to make an intelligent prediction of) what the user or device is going to do next. One method is to determine connections between events, such as determining that when event A occurs there is a sufficiently high likelihood of event B happening. This allows the system to pre-compute the impact of event B on the state of a system or environment.

For example, it is possible that an event could represent an action such as moving in a 3D space. If the system notices that moving to the left is followed by moving straight, then it will precompute moving straight. This can be determined using a Bayesian network. A key aspect to note is that as everything is event driven, one can correlate events and make event predictions, which translates to applying an operator to an entity to cause it to move from one state to another. As described, the use of a Bayesian network in the context of the inventive system differs from the conventional use of a Bayesian network, as it is possible that a given event may occur multiple times in a graph. Note this is more in accordance with human behavior and experience.

With the approach described, it is possible to generate an unsupervised learning machine (for example, the previously described neural network) that is able to map out dependencies and causal relationships (note that in a typical Bayesian network, causality is implied but not guaranteed). In the case of the inventive system, it is more likely that the Bayesian network can identify a root cause of an event, as it can analyze a sequence of possibly repeating events and identify events that are highly likely to cause a change in state. Another advantage of this approach is that, because the network is unsupervised, it is able to dynamically update itself as more information arrives. In contrast, most implementations of Bayesian networks have difficulty doing this (or are unable to) because cyclical Bayesian networks are typically prohibited.

This approach is different from conventional predictive systems that are used to optimize data traffic, as conventionally, prediction is based on identifying data that is most frequently accessed and storing that data on the client side, with the less frequently accessed data stored on the data server side (this is conventionally termed "intelligent caching").

The inventive approach "learns" from the user and makes predictions about what the user is expected to do next, and then prepares the configuration of the system for the anticipated behavior. This is different from (and more effective than) conventional methods because it is capable of understanding more complex behavior than simply identifying the most frequently used data.

For example, one implementation could be to break down operations into logical "memes", construct the system based on instruction sequences and then make predictions as to what will be executed next. In this approach, events correspond to distinct operations. It is assumed that when an event S is received, an action A(S) is executed, where A is a logical function or operation, as represented by a meme. By analyzing an example of the network, the system can learn that if A happens, then it is likely that action B or C will happen next (but not E or D). This allows the system to pre-compute the actions of A, B, and C, on the state of the system and store the results, or to pre-compute a sequence of actions and pre-load an instruction sequence for more rapid execution.

Note that this approach is different from conventional approaches, such as data or instruction prefetching, because in the case of pre-fetching a system is analyzing application usage and then pre-loading data that the application is expected to need. In contrast, in the case of the inventive system, predictions are made at the instruction level, followed by pre-loading and executing those instructions, with the outcome being stored in memory.

Saliency based load balancing. Using this technique, the system is able to understand when the user/device (actor) is about to change its behavior and then notify the back-end processing elements to prepare for the change in behavior (by, for example, adding more computational resources, or pre-buffering data);

For example, an understanding of the relative saliency of an event occurring within a system can be used to identify and implement changes in resource usage needs, either by making decisions as to when to de-allocate resources or (conversely) when to allocate resources;

Based on the concept of saliency, it is also possible to identify errors in an application, an emerging problem in a flight control system, a potential health issue emerging in a patient, impeding changes in the stock market or economic system, or anomalous readings as a result of an intrusion in an intrusion detection system that utilizes this approach to indicate an unexpected or not previously experienced event or situation. Saliency can also be used by a system to identify possible errors, and to determine whether variations in a user's or system's behavior are inconsistent with previous behavior;

Event sequence caching. If the system detects a clustering of events, then it will cache them and download content from the back end server that is required for handling the set of events, instead of all of the possibly relevant content;

An example of this use case is that of the operation of a gaming system—in a gaming environment, if common things occur (such as some area of virtual gaming being used), then there could be markers in this gaming area. If the system recognizes that a standard set of markers are encountered in sequence or nearly in sequence as a result of a user taking some action (such as opening a door and going down a corridor), then when a user hits one of these markers, the game system will have already downloaded the resources/assets it needs to render the parts of the environment that the user is likely to traverse next because it recognizes that the marker was part of a sequence. Similarly, the gaming system will not download other aspects or areas of the game that are not expected to be used;

Another possible use case is that of a "smart" house that is able to recognize that its owner typically follows a certain sequence when entering the house—e.g., comes in, goes into the living room, starts the fireplace, turns on the TV, goes to the refrigerator, etc. In such as case, as soon as the house detects that the owner is approaching the house, it could start up the fireplace, turn on the TV, turn on the lights in the living room etc.;

Data interpolation. In this situation, the system applies an auto-associative neural network to reconstruct a set of data using partial information (as was described with reference to FIGS. 7-9);

Perception based logic that adapts to human perception (e.g., incorporation of high resolution in the center of vision, with a more blurred exterior to mimic the behavior of the human eye and mind); or Application of a technique based on discrete differential geometry—in this approach, rather than specifying every node in a 3D mesh, the system can make reconstructions/interpolations based on the anticipated curvature of a space or region. This approach uses certain recognized local information about the curvature/geometry of a shape to reduce the amount of data that is needed to be transferred over a network to define that shape to a client device or system.

A hardware based implementation of an embodiment of the inventive adaptor will be responsible for a large amount of processing and therefore will consume a significant amount of power. In some embodiments, the system may use one or more of several methods to minimize or reduce power consumption, such as:

Using FPGAs to handle most of the AI logic in hardware without losing the ability to update the hardware;

Non-essential parts of the hardware are handled by a low power processor;

Use a minimalist user interface;

No sensors or peripherals;

Aggressive sleep policies;

Passive liquid based cooling system;

Ultra-low power wireless components;

Low power buses for non-critical operations; or

Using the Peltier Effect for some amount of power recovery.

It is also possible to provide most, if not all, of the adaptor as a software application, running on a standard computing device such as a PC, tablet, cell-phone, IoT (internet of things) device, printer, camera, or any other device with an onboard computer. Naturally, the capabilities will be more restricted as the adaptor will not utilize the same amount of processing capability due to the resident device's power constraints.

In some embodiments, the adaptor and/or a server side process may utilize a central engine that understands or can discover certain characteristics of the type of data that is being transferred. In such a case, data that is entered into a server platform may be transformed into a format that can be optimized. For example, programs/applications may be analyzed probabilistically for likely instruction sets or logic flow, data may be broken down by analyzing content, etc. For example if a photo is being sent, then the photo may be analyzed for faces, dogs, trees, elements of symmetry, translations, inversions, etc., and then a reduced data set is prepared and sent to the client. Videos and movies can similarly be broken down into scenes with only partial data being sent from the platform to the client over a network, where it is reconstructed into the original scenes. These methods may produce the effect of even higher degrees of data compression than conventional methods.

Unlike some conventional data compression methods, the inventive approaches are based on the structure of and relationships between the actual content that is being sent, with the optimization being based on that content. In some embodiments, the inventive system can understand that it is sending a picture of a face or a dog and then perform the optimizations based on that knowledge (e.g., because it knows that the client can recognize a dog or a person from incomplete information, based on previous experience, object symmetries, general relationships between elements, proportions, etc.).

Additional optimizations (such as those based on saliency) may permit more efficient use of resources or the ability to pre-load data that supports the nominal behavior of a system. This can operate to make the execution of an application more efficient when it is in the nominal mode. This approach is different from caching based on a pre-fetch of an application, as such a pre-fetch lacks a runtime understanding of the logic flow of an application beyond the fact that the application is used frequently. In contrast, the inventive system can discover or identify an application's nominal state and optimize resource allocation for that expected behavior. If the application's nominal behavior changes, then the system can identify that change (via detection of a salient event) and adapt to make the new behavior the "nominal" one.

An example of this property is the following. For a given application, assume that User A uses function 1 but only if an hour has passed after function 2 and function 3 have been called, and function 3 will only be called if function 5 is called two hours before then. In such a case, if function 2 and function 5 are frequently called, then the system will operate to load resources for function 1 and function 3 automatically at the optimal times, as it will be able to determine that function 1 and function 3 are part of the application's nominal functioning.

In some embodiments, an integrated circuit (IC chip) may be used which is capable of executing, or being used to execute, one or more of the inventive optimization processes, functions, or operations. In some embodiments, such a chip may be designed to be capable of being updated to include changes to the set of algorithms being used to perform the optimization processes. One way to implement this capability is to use programmable hardware, such as a combination of EEPROMs and FPGAs.

Note that as an optimization platform/system develops wider usage, the central association engine (as might be implemented in the form of one or more coupled neural networks and/or modeling based on the conditional probabilities between events or program instructions) becomes more and more powerful due to having a larger set of data to process and learn from. This can lead to order of magnitude improvements in managing network traffic by being able to make advances in the area of associating/linking different pieces of data together that initially appear unrelated. This means, for example, that a client can reconstruct complex data with less of the original data as the platform/system continues to develop. It also means that the platform/system may become capable of effectively processing increasingly complex data sets as it continues to learn and develop its capabilities.

Although some of the description of one or more embodiments of the inventive system and methods have been in the context of the construction of gaming and simulations that include virtual environments and virtual entities, it should be noted that the described techniques, system architectures, and processes may be used to construct a distributed network of autonomous agents, each with certain basic capabilities and functionality, and also with agent specific qualities. Further, each agent may belong to one or more subgroups, sets, etc., which do not include all of the agents.

In some cases, such agents may function as an operating entity in a simulated communications network, computing network, transportation network, social network, environment, etc. Because of certain qualities/capabilities of the created agents/virtual entities, those entities are capable of moving between networks and establishing communications and participating in interactions such as monitoring, collecting data, etc.

The structure, operation, and administration of such agents and their possible implementations are discussed in greater detail in the United States Non-Provisional Patent Application entitled "System and Methods for Generating Interactive Virtual Environments", application Ser. No. 14/878,262, assigned to the same entity as the present application and filed concurrently with this application, and the contents of which are hereby incorporated by reference in their entirety for all purposes.

In accordance with at least one embodiment of the invention, the system, apparatus, methods, processes and/or operations for implementing one or more types of data, event, or instruction optimizations may be wholly or partially implemented in the form of a set of instructions executed by one or more programmed processors, such as a central processing unit (CPU) or microprocessor. Such processors may be incorporated in an apparatus, server, client or other computing device or platform operated by, or in communication with, other components of the system.

Figure 13:
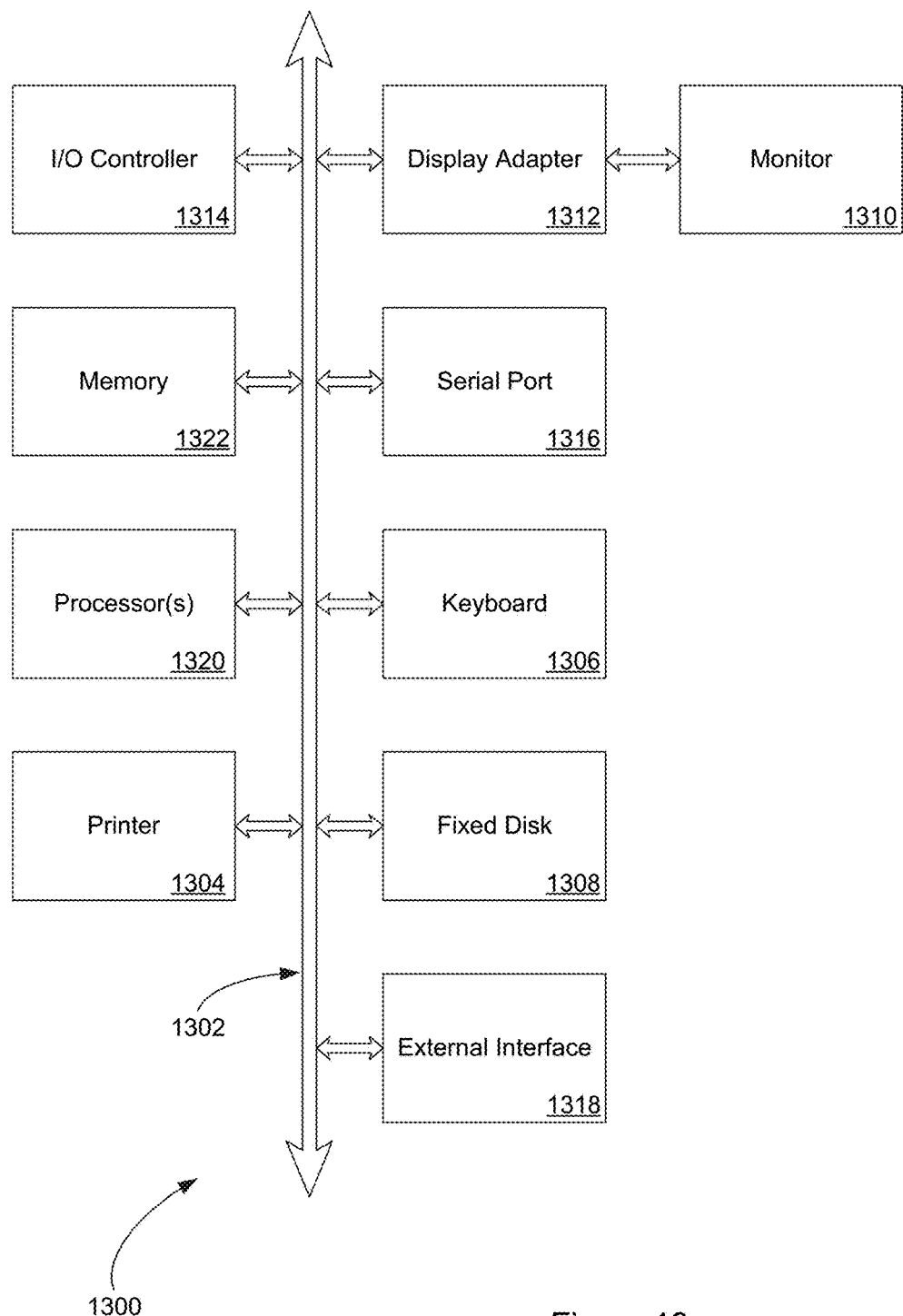
FIG. 13 is a diagram illustrating elements that may be present in a computer device and/or system 1300 configured to implement a method and/or process in accordance with some embodiments of the present invention.

As an example, FIG. 13 depicts aspects of elements that may be present in a computer device and/or system 1300 configured to implement a method and/or process in accordance with some embodiments of the present invention. The subsystems shown in FIG. 13 are interconnected via a system bus 1302. Additional subsystems include a printer 1304, a keyboard 1306, a fixed disk 1308, and a monitor 1310, which is coupled to a display adapter 1312. Peripherals and input/output (I/O) devices, which couple to an I/O controller 1314, can be connected to the computer system by any number of means known in the art, such as a serial port 1316. For example, the serial port 1316 or an external interface 1318 can be utilized to connect the computer device 1300 to further devices and/or systems not shown in FIG. 13, including a wide area network such as the Internet, a mouse input device, and/or a scanner. The interconnection via the system bus 1302 allows one or more processors 1320 to communicate with each subsystem and to control the execution of instructions that may be stored in a system memory 1322 and/or the fixed disk 1308, as well as the exchange of information between subsystems. The system memory 1322 and/or the fixed disk 1308 may embody a tangible computer-readable medium.

In addition to the uses described herein, embodiments or applications of the inventive system and methods may be used for one or more of the following purposes or goals:

Implementing a system that can develop a deeper understanding of an environment by collecting data from a group of deployed adaptors or other system elements that collect data in order to identify associations between different data streams and uncover relevant or associated patterns;

Creation of software applications and/or generating recommended changes by collecting code snippets, probability, and popularity maps to improve logic flow or the efficiency of user interactions;

Generating predictions in complex systems and system models, such as for the economy, climate, elections, the stock market, large-scale transportation or communications networks, etc.;

Military/police systems—improving the recognition of people or things based on minimal data, targeting, friend or foe identification, etc.;

Archeology—generate complex reconstructions based on minimal information regarding a location, building, etc.;

Behavioral prediction—assisting in understanding how people will behave based on previous behavior and environmental states—may be useful in predicting and/or preventing crime;

Reducing data storage requirements on the client and/or server side while maintaining a desired level of content fidelity;

Based on behavioral information, likes/dislikes and the associational engine that exists at the server level—creating more effective social matching/dating applications, generating product recommendations, implementing a more effective digital personal assistant, developing highly customized applications catering to individual uses or situations, etc.;

Creation of a more intelligent search engine based on the collection of associational data that can improve relevancy of search results:

Note that as the system learns from a user, the search data can be made more contextual—for example when a frequent shopper of fashion items executes a search using the word "clutch"—the search should return small handbags. However, an aficionado of cars should get search results relating to car/transmission clutches;

Solving complex multivariate problems—the associational engine can build a model of an environment (real or imagined) and identify potentially related factors, events, etc. that represent "insights";

Effective fault or error prediction/detection using aspects of the saliency properties of the system; and Environmental or system intrusion detection (such as unauthorized access to a building, system, database, etc.) using aspects of the saliency properties of the system.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An optimization platform for providing a data processing service to a client device, the platform comprising:
   a communicative coupling to a source of the data processing service, the data processing service hosting a data processing application, a set of data, or both; and;
   an electronic processor programmed with a set of executable instructions, which when executed cause the optimization platform to perform;
   a first optimization process operable to identify an association between a first subset of the set of data and a second subset of the set of data, wherein the first optimization process includes operating an associative neural network, the neural network including elements operable to determine that a first event and a second event are generated within a specified time interval, and further, wherein the associative neural network further includes a layer resident in the client device for accepting input data and signals;
   a second optimization process operable to determine one or more executable instructions that are part of the data processing application and that may be executed by the client device in response to a signal received from the client device;
   a data transfer process configured to provide the client device with the second subset of the set of data in response to a signal received from the client device requesting the set of data; and
   an application transfer process configured to provide the client device with the one or more executable instructions that are part of the data processing application and that may be executed by the client device in response to the signal received from the client device.

2. The optimization platform of claim 1, wherein the second optimization process includes:
   for each of a plurality of a first executable instruction or set of executable instructions and a second executable instruction or set of executable instructions, determining a probability of occurrence between the first executable instruction or first set of executable instructions and the second executable instruction or second set of executable instructions;
   constructing a representation of a logic flow of the data processing application, the representation including multiple nodes, wherein a transition between two nodes is associated with the probability of occurrence between the first node and the second node;
   based on a current or expected executable instruction or instructions and the constructed representation, determining one or more instructions that may be executed in response to the current or expected executable instruction or instructions; and
   providing the one or more instructions that may be executed in response to the current or expected executable instruction or instructions to the application transfer process.

3. The optimization platform of claim 1, wherein the first optimization process operates to identify an association between a first element of an image and a second element of an image.

4. The optimization platform of claim 1, wherein the data processing application includes one or more of an image processing application, a video processing application, an application for processing business related data, an application used to generate a virtual environment, or an application used to construct a simulation.

5. The optimization platform of claim 1, wherein the communicative coupling is a data network.

6. The optimization platform of claim 1, wherein the first event and the second event are associated with the execution of one or more instructions.

7. The optimization platform of claim 1, wherein the first optimization process determines a set of conditional probabilities between the first and second events.

8. The optimization platform of claim 1, wherein the client device is one of a laptop computer, notebook computer, personal digital assistant, smart phone, or cell phone.

9. The optimization platform of claim 2, wherein determining a probability of occurrence between the first executable instruction or first set of executable instructions and the second executable instruction or second set of executable instructions further comprises determining a conditional probability.

10. The optimization platform of claim 2, further comprising:

determining a result of executing the first executable instruction or set of executable instructions;

storing the determined result;

determining that the first executable instruction or set of executable instructions were executed by the client device; and transferring the determined result of executing the first executable instruction or set of executable instructions to the client device using the application transfer process.

* * * * *